United States Patent [19]
Sherman et al.

[11] Patent Number: 5,734,756
[45] Date of Patent: Mar. 31, 1998

[54] METHODS AND APPARATUS FOR REPRODUCING A GRAY SCALE RASTER REPRESENTED ELONGATE GRAPHIC IMAGE INCLUDING VECTORIZING A SKELETON OF THE IMAGE BY DETERMINING A MIDPOINT BETWEEN TWO DETECTED ENDPOINTS OF THE IMAGE

[75] Inventors: Alexander Sherman, Beit-Shemesh; Zvi Eintracht, Ramat Gan, both of Israel

[73] Assignee: Scanvec Co. Ltd., Tel Aviv, Israel

[21] Appl. No.: 382,481

[22] Filed: Feb. 1, 1995

[51] Int. Cl.$^6$ ............................................. G06K 9/48
[52] U.S. Cl. ............................. 382/259; 382/288
[58] Field of Search ............................. 382/258, 259, 382/286, 288; 345/135; 364/474.03; 395/104

[56] References Cited

U.S. PATENT DOCUMENTS 3,673,566  6/1972  Reede ........................... 340/146.3 AE
5,091,974  2/1992  Sasahara et al. ...................... 382/55

FOREIGN PATENT DOCUMENTS 59-5387  1/1984  Japan ............................... 382/259

OTHER PUBLICATIONS

English Translation of Japanese Kokai No. 59–5387, Miyagawa et al., Jan. 1984.
Gonzalez et al., *Digital Image Processing*, 1992, Addison–Wesley Publ. Co., 492–494.
Schneider P., "An Algorithm for Automatically Fitting Digitized Curves", *Graphic Gems*, Ed. Academic Press Professional, 1990, 612–626, 797–807.

*Primary Examiner*—Andrew Johns
*Attorney, Agent, or Firm*—Woodcock Washburn Kurtz Mackiewicz & Norris LLP

[57] ABSTRACT

A method for generating a vector representation of the skeletal configuration of an elongate graphic image from a raster representation thereof, the method comprising providing a gray scale raster representation of the graphic image, for at least one of a plurality of lines of the raster representation, performing the following processes at least once: employing the gray scale raster representation to determine two path endpoints and computing a midpoint between the two endpoints.

27 Claims, 15 Drawing Sheets

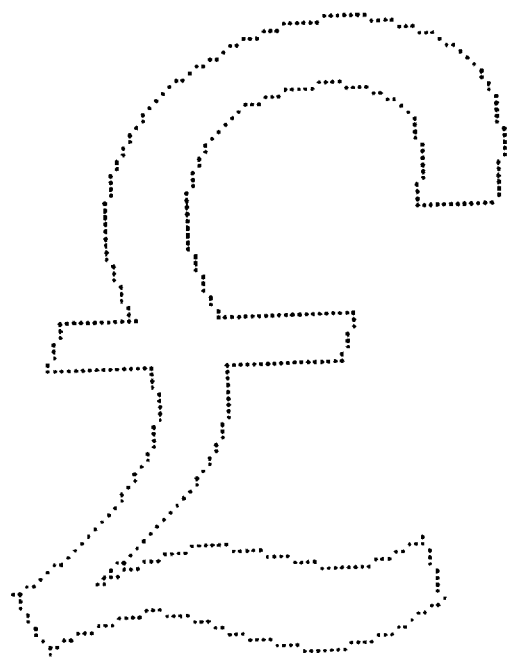 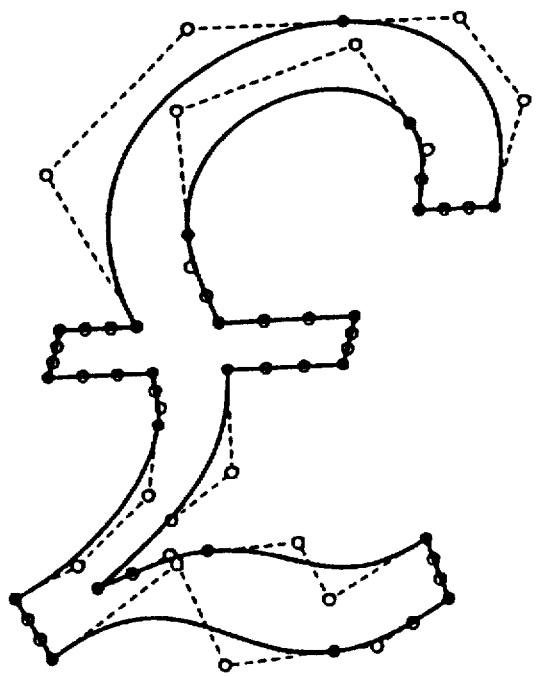
FIG. 14
PRIOR ART
FIG. 15
PRIOR ART

METHODS AND APPARATUS FOR REPRODUCING A GRAY SCALE RASTER REPRESENTED ELONGATE GRAPHIC IMAGE INCLUDING VECTORIZING A SKELETON OF THE IMAGE BY DETERMINING A MIDPOINT BETWEEN TWO DETECTED ENDPOINTS OF THE IMAGE

FIELD OF THE INVENTION

The present invention relates to methods and apparatus for reproducing a raster represented elongate graphic image by means of a mechanical process and methods and apparatus for performing a mechanical operation on a surface.

BACKGROUND OF THE INVENTION

Commercially available products exists which are operative to generate a vector representation of a graphic image from a raster representation thereof. These are useful in converting a raster representation of a graphic image into a vector format which is usable by mechanical equipment which processes along a closed or open path, such as cutters, routers and engravers.

These products include Corel Trace!, marketed by Corel Systems Corporation, 1600 Carling Ave., Ottawa, Ontario, KIZ8R7, Canada; and Adobe Streamline, Adobe Systems Incorporated, 1585 Charleston Road, Mountain View, Calif., 94039-7900.

One known vectorization method is centerline vectorization, which is employed by both the Corel Trace! and Adobe's Streamline.

The following references and all publications referred to therein are hereby incorporated herein by reference:

Gonzalez, R. C. and Woods, R. E., *Digital image processing,* Addison-Wesley Publishing Company, 1992, pp. 492–494; and Schneider, P. J., "An algorithm for automatically fitting digitized curves", Graphic Gems, Andrew S. Glassner (Ed.), Academic Press Professional, 1990.

Performing a physical process on an area using a tool with a given radius of operation by translating the tool along a plurality of nested paths is known. FIG. 18 is a graphic illustration of a conventional method for filling an area in which deviations toward bends are provided and in which the return path from the deviation does not even partly coincide with the deviation itself. FIG. 18 was generated by operating the SignLab system, marketed by CADlink Technology Corporation, 2440 Don Reid Drive, Suite 100, Ottawa, Canada K1H8P5.

SUMMARY OF THE INVENTION

The present invention seeks to provide an improved system for reproducing the skeletal configuration of a raster representation of an elongate graphic image by means of a mechanical process such as cutting, routing, engraving or drawing. The term "skeletal configuration" refers to a linear representation of at least a portion of an image which includes at least one generally elongate element. For example, the image on substrate 14 of FIG. 1 includes a plurality of ellipse-shaped contours each of which is generally elongate in configuration. It is appreciated that the contours would be considered elongate even if they were circular in shape, because they are close to linear. On the other hand, solid ellipses would not be considered elongate because they are not close to linear.

The present invention also seeks to provide an improved system for centerline vectorization of the skeletal configuration of a raster representation of an elongate graphic image.

There is thus provided in accordance with a preferred embodiment of the present invention a method for generating a vector representation of the skeletal configuration of an elongate graphic image from a raster representation thereof, the method including providing a gray scale raster representation of the graphic image, for at least one of a plurality of lines of the raster representation, performing the following processes at least once: employing the gray scale raster representation to determine two path endpoints, and computing a midpoint between the two endpoints.

Further in accordance with a preferred embodiment of the present invention the method includes generating a centerline to fit the midpoints.

Still further in accordance with a preferred embodiment of the present invention the method includes, for each junction which includes at least three junction-adjacent ends of raster image contour segments, connecting pairs of junction-adjacent segment ends so as to minimize angular separation between the tangents to connected junction-adjacent segment ends.

There is also provided in accordance with a preferred embodiment of the present invention a method for generating a vector representation of the skeletal configuration of an elongate graphic image from a raster representation thereof, the method including completing a centerline of junction-adjacent segments of the skeletal configuration of the graphic image, the completing process including, for each junction which includes at least three junction-adjacent ends of image contour segments, connecting pairs of junction-adjacent segment ends so as to minimize angular separation between the tangents to connected junction-adjacent ends of image contour segments.

Further in accordance with a preferred embodiment of the present invention the method includes performing a physical operation along a centerline of the skeletal configuration of the graphic image which fits the midpoints.

Still further in accordance with a preferred embodiment of the present invention the physical operation includes cutting.

Yet further in accordance with a preferred embodiment of the present invention the physical operation includes routing.

Additionally in accordance with a preferred embodiment of the present invention the physical operation includes engraving.

Further in accordance with a preferred embodiment of the present invention the physical operation includes painting.

Still further in accordance with a preferred embodiment of the present invention the physical operation includes printing.

There is additionally provided in accordance with a preferred embodiment of the present invention a method for performing a physical operation on a surface, the method including performing a physical operation on a surface by proceeding along a plurality of nested paths running generally parallel to the contour of the surface, and adjacent at least one bend of the path, deviating toward the bend and at least partly retracing along the deviation in order to return to the path.

While deviating and retracing, the machine performing the physical operation may be in its "up" (non-operative) position some of the time, or none of the time. The machine may, similarly, be in its "down" (operative position) only some of the time or all of the time. For example, the machine may deviate in the "down" position and retrace in the "up" position.

Further in accordance with a preferred embodiment of the present invention the physical operation is performed for each of the plurality of nested paths and deviation toward the bend is performed for each path.

There is yet further provided in accordance with a preferred embodiment of the present invention a method for identifying midpoints lying along the skeletal configuration of a graphic image from a raster representation thereof, the method including providing a gray scale raster representation of the graphic image, for each of a plurality of lines of the raster representation, determining two path endpoints, and computing a midpoint between the two endpoints.

Further provided in accordance with a preferred embodiment of the present invention is a method for connecting junction-adjacent ends of raster image contour segments, the completing process including analysing the configuration of the junction-adjacent ends, and generating a connection between the junction-adjacent ends which is substantially independent of the configuration of the junction in the raster image.

There is also provided in accordance with a preferred embodiment of the present invention apparatus for generating a vector representation of the skeletal configuration of an elongate graphic image from a raster representation thereof, the apparatus including a gray-scale scanner operative to perform gray-scale scanning of a graphic image, thereby to generate a gray scale raster representation of the graphic image, an endpoint identifier operative to determine two path endpoints, and a midpoint computer operative to compute a midpoint between the two endpoints.

Further in accordance with a preferred embodiment of the present invention the endpoint identifier and midpoint computer operate on each of a plurality of rows and on each of a plurality of columns and wherein the midpoints computed for lines which are generally parallel to the skeletal configuration of the graphic image are substantially disregarded.

Still further in accordance with a preferred embodiment of the present invention the apparatus includes a connector operative to connect pairs of junction-adjacent segment ends, so as to minimize angular separation between the tangents, to connected junction-adjacent image segment ends.

There is yet further provided in accordance with a preferred embodiment of the present invention apparatus for generating a vector representation of the skeletal configuration of a graphic image from a raster representation thereof, the apparatus including apparatus operative to complete the centerline including a connector operative to connect pairs of junction-adjacent segment ends, so as to minimize angular separation between the tangents, to connected junction-adjacent segment ends.

Further in accordance with a preferred embodiment of the present invention the apparatus includes mechanical apparatus for performing a mechanical operation along the centerline of the skeletal configuration of the graphic image.

Still further in accordance with a preferred embodiment of the present invention the mechanical apparatus includes a cutter.

Yet further in accordance with a preferred embodiment of the present invention the mechanical apparatus includes a router.

Additionally in accordance with a preferred embodiment of the present invention the mechanical apparatus includes an engraver.

Also in accordance with a preferred embodiment of the present invention the mechanical apparatus includes a painter.

Further in accordance with a preferred embodiment of the present invention the mechanical apparatus includes a printer.

There is still further provided in accordance with a preferred embodiment of the present invention apparatus operative to perform a physical operation on a surface, the apparatus including physical apparatus for performing a mechanical operation on a surface by proceeding along a plurality of nested paths running generally parallel to the contour of the surface, wherein, adjacent at least one bend of the path, the physical apparatus deviates toward the bend and at least partly retraces along the deviation in order to return to the path.

Further in accordance with a preferred embodiment of the present invention the physical apparatus is operative to perform on each of the plurality of nested paths and to deviate toward the bend for each path.

There is additionally provided in accordance with a preferred embodiment of the present invention apparatus operative to identify midpoints lying along the skeletal configuration of a graphic image from a raster representation thereof, the apparatus including a gray-scale scanner operative to perform gray-scale scanning of a graphic image, thereby to generate a gray scale raster representation of the graphic image, an endpoint identifier operative to determine two path endpoints, and a midpoint computer operative to compute a midpoint between the two endpoints.

Still further in accordance with a preferred embodiment of the present invention the physical apparatus is operative to deviate toward the bend and to approximately or exactly retrace along the deviation in order to return to the path.

Additionally in accordance with a preferred embodiment of the present invention the method includes performing a physical operation along the centerline.

Further in accordance with a preferred embodiment of the present invention the gray-scale representation providing process includes gray-scale scanning of a graphic image.

Yet further in accordance with a preferred embodiment of the present invention the processes performed at least once for at least one line are performed at least once for at least one column and at least once for at least one row.

Further in accordance with a preferred embodiment of the present invention the method includes selecting a plurality of skeleton pixels, and replacing each skeleton pixel with the midpoint computed for a line in which the skeleton pixel is included.

Still further in accordance with a preferred embodiment of the present invention the line includes the row in which the skeleton pixel is included, if the endpoints for that row are closer together than the endpoints for the column in which the skeleton pixel is included, and wherein the line includes the column in which the skeleton pixel is included, if the endpoints for that column are closer together than the endpoints for the row in which the skeleton pixel is included.

Also in accordance with a preferred embodiment of the present invention the line includes a row.

Additionally in accordance with a preferred embodiment of the present invention line includes a column.

Further in accordance with a preferred embodiment of the present invention the deviating process includes exactly retracing along the deviation in order to return to the path.

BRIEF DESCRIPTION OF THE DRAWINGS

The present invention will be understood and appreciated from the following detailed description, taken in conjunction with the drawings and appendices in which:

FIGS. 10 to 17 are diagrams useful in understanding a prior art curve-fitting method;

Attached herewith are the following appendices:

Appendix A is a sample implementation of the algorithm for automatically fitting digitized curves as described by Schneider; and Appendix B is a sample implementation of Schneider's algorithm for fitting a single cubic Bezier segment to a set of points.

DETAILED DESCRIPTION OF A PREFERRED EMBODIMENT

Figure 1:
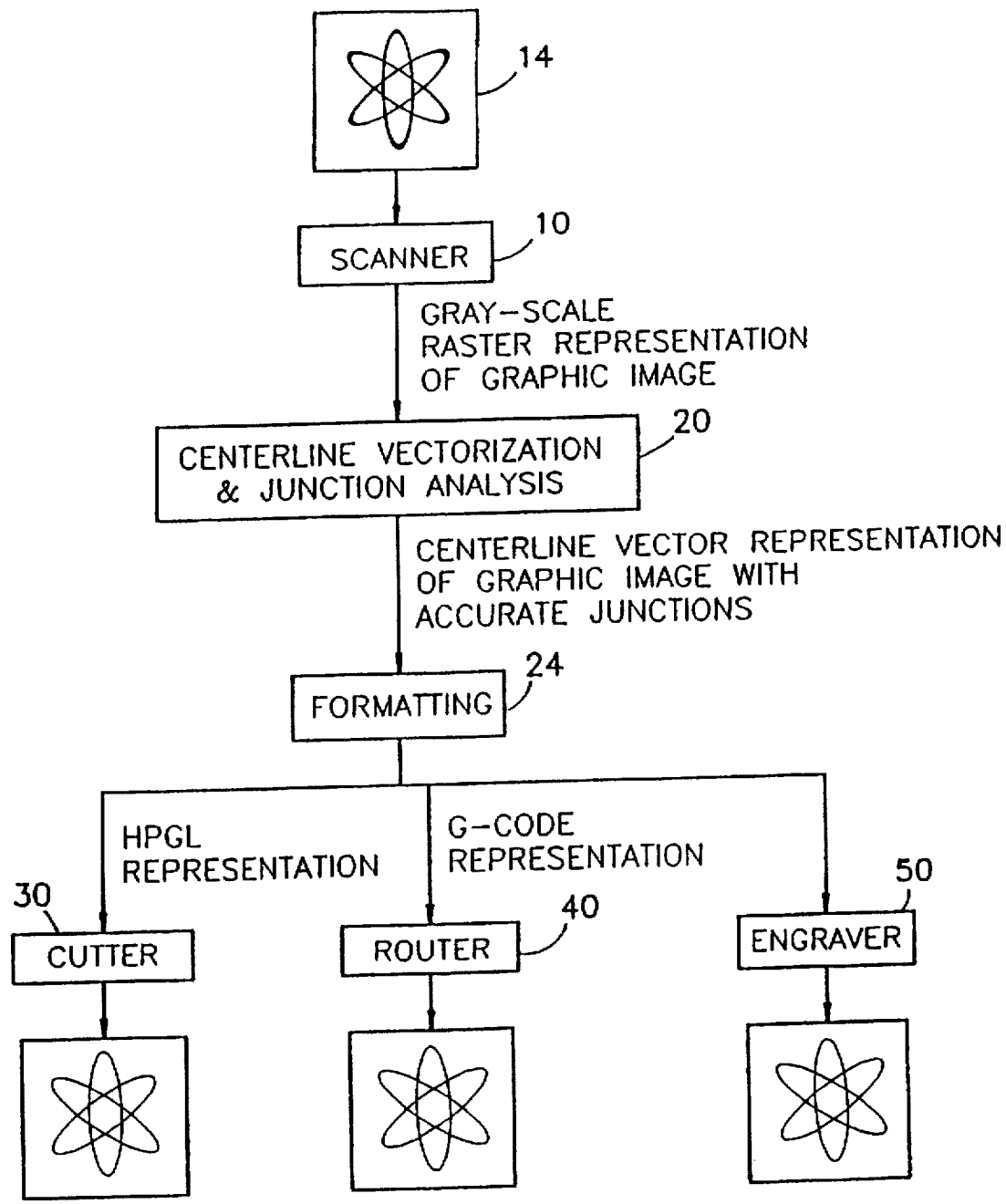
FIG. 1 is a simplified block diagram of a system for physically processing a substrate along the skeletal configuration of an elongate graphic image.

FIG. 1 is a simplified block diagram of a system for physically processing a substrate along the skeletal configuration of an elongate graphic image. The system of FIG. 1 includes a electro-optical scanner 10 such as a HP ScanJet which is operative to scan a document or other substrate 14 bearing an elongate graphic image. It is noted that although closed, i.e. solid figures are not usually elongate graphic images, the outline of a closed figure is an elongate graphic image.

The scanner 10 generates a raster representation of the graphic image which is preferably multi-level or gray scale although it may also be a binary representation. The raster representation of the graphic image is received by a centerline vectorization and junction analysis module 20 which is described in detail below with reference to FIG. 2. Alternatively, the raster representation fed to module 20 may arrive from a source other than a scanner, such as an image creation workstation or electronic storage.

The centerline vectorization and junction analysis module 20 is operative to find the centerline of the skeletal configuration of the raster represented graphic image, preferably relying on gray-scale level information, and to identify and analyze junctions so as to accurately reproduce their structure. The term "junction" is used here to denote a meeting point of at least three line segments.

The output of module 20 is formatted by a formatting module 24 to achieve compatibility with conventional mechanical path processing devices such as but not limited to a cutter 30, a router 40 and an engraver 50. For example, the output format may be HPGL, DMPL, GPGL or G-Code. Suitable commercially available path processing devices and the input formats they employ include, for example, the following:

Cutter: Roland CAMM-1 plotter (HPGL format)
Router: ABC Tech System Router (G-Code format)
Engraver: Roland CAMM-2 engraver (HPGL)

Figure 2:
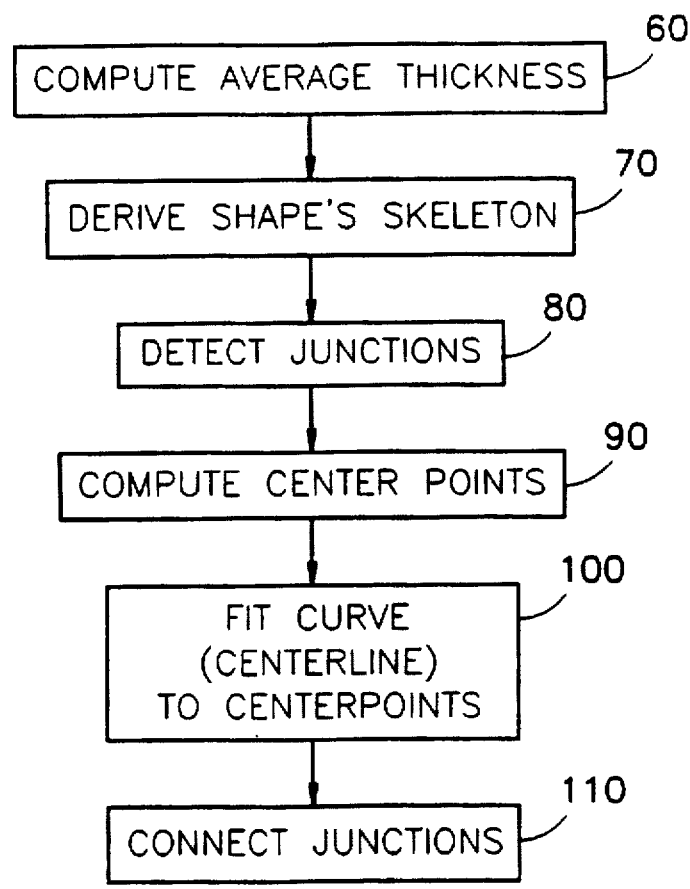
FIG. 2 is a flowchart illustration of the centerline vectorization and junction analysis block of FIG. 1.

Reference is now made to FIG. 2 which is a flowchart illustration of a preferred mode of operation for the centerline vectorization and junction analysis block of FIG. 1. As described above, the module 20 is operative to find the centerline of the skeletal configuration of a raster represented graphic image, preferably relying on gray-scale level information, and to identify and analyze junctions so as to accurately reproduce their structure.

The operation of module 20 preferably includes the following processes:

PROCESS 60: The raster graphic image is binarized and the average thickness or width of the "black" portions thereof is computed, both along the horizontal axis of the raster representation and along the vertical axis thereof. The output value is an average thickness along both axes of the raster representation. "Width" is here defined as the number of successive "black" pixels along a horizontal raster line (row) or along a vertical raster line (column).

The average thickness is subsequently employed as a criterion to identify junctions, as described in more detail below. It is emphasized that the "thicker than average line width" criterion employed herein to identify junctions is not intended to be limiting, and other suitable junction-identifying criteria may be employed.

PROCESS 70: The periphery of the binarized graphic image is eroded until what remains is a generally one-pixel wide skeleton, although, at junctions, the skeleton is typically more than one pixel wide. The skeleton pixels are marked as such in the raster image.

A preferred implementation of process 70 is based on the method of Zhang and Suen, 1984, as described in Gonzalez, R. C. and Woods, R. E., *Digital image processing*, Addison-Wesley Publishing Company, 1992, pp. 492–494. The preferred implementation is now described:

The following definitions are provided:

Any region pixel ("black") is marked as binary "1";

Any background pixel ("white") is marked with binary "0";

For consistency, the neighbourhood arrangement described by the following map is used:

p9 p2 p3
p8 p1 p4
p7 p6 p5

A borderpoint is any pixel with value 1, and having at least one neighbour (p2,p3 . . . p9) valued 0.

One iteration of the thinning method is:

a) Apply step 1 to all border pixels;

b) Apply step 2 to the result of step 1.

This basic procedure is applied iteratively until no further points are deleted. At that time the method terminates, yielding the skeleton of a region.

The method of Zhang and Suen may comprise the following steps:

Step 1: Mark any border pixel for deletion, if all the following conditions are satisfied:

$2 =< N(p1) =< 6$      a)

$S(p1) = 1$      b)

$p2 \times p4 \times p6 = 0$      c)

$p4 \times p6 \times p8 = 0$      d)

Delete (change from 1 to 0) marked pixels.

Step 2: Mark any border pixel for deletion, if all the following conditions are satisfied:

$2 =< N(p1) =< 6$      a)

$S(p1) = 1$      b)

$p2 \times p4 \times p8 = 0$      c')

$p2 \times p6 \times p8 = 0$      d')

Delete marked pixels.
Where:
N(p1) is the number of none zero neighbours of p1:

$N(p1) = p2 + p3 + \ldots + p8 + p9$

S(p1) is the number of 0–1 transitions in the ordered sequence p2,p3, . . . p8,p9,p2.

One iteration of the thinning method is:
Apply Step 1 to all border pixels;
Apply Step 2 to the result of Step 1.

This basic procedure is applied iteratively until no further points are deleted. At that time, the method terminates, yielding the skeleton of a region.

PROCESS 80: Junctions are detected. A junction is a skeleton pixel which has more than two neighboring skeleton pixels, such that it is connected to at least three different edges.

PROCESS 90: The centerpoints, also termed herein "midpoints", of the gray image are now computed. For each skeleton pixel, the centerpoint of the gray image horizontal line on which the skeleton pixel resides is computed and/or the centerpoint of the gray image vertical line on which the skeleton pixel resides is computed. The output centerpoint, for that skeleton pixel, is the centerpoint of the shorter of the horizontal and vertical lines.

If the gray image horizontal or vertical line, for an individual skeleton pixel, is longer than the average width computed in process 60 then no centerpoint is computed because the skeleton pixel, in this case, is assumed to be a junction pixel. Therefore, the output of this process is a plurality of distinct sets of points. It is appreciated, however, that the above criterion for determining whether a skeleton pixel belongs to a junction is not the only suitable criterion.

A preferred process for computing centerpoints includes the following stages:
For each skeleton pixel, perform:
a. Horizontal endpoint detection;
b. Vertical endpoint detection; and
c. Midpoint computation.

A preferred method for performing each of the above stages is as follows:

a. Horizontal endpoint detection: In the original gray-scale raster image, move toward the left on the horizontal line containing the pixel. When two adjacent pixels are found, one having a gray level below 128, whereas its left-side neighbor has a gray level exceeding 127, the left endpoint is computed. This is a point on the line connecting the centers of the two adjacent pixels, where the gray level is 128, assuming linearity between the two pixels' gray levels.

The right endpoint is found similarly.

b. Vertical endpoint detection: The two vertical endpoints are found similarly to the way the horizontal endpoints are found, except that motion is along the vertical line containing the pixel rather than along the horizontal line containing the pixel.

c. Midpoint computation: The width is computed as the distance between the two horizontal endpoints. The height is computed as the distance between the two vertical endpoints. A midpoint is computed only if the width or height is no larger than the average line width computed above. If the width is less than the height, the midpoint is computed as the middle of the line connecting the two horizontal endpoints. If a midpoint was not computed, because both the width and the height were large, a junction is marked which is dealt with as described below.

PROCESS 100: Fit center lines to the center points computed in process 90. Any suitable conventional method may be employed to fit a line to the centerpoints of process 90 such as the method described in Schneider, P. J., "An algorithm for automatically fitting digitized curves", in Graphic Gems, Andrew S. Glassner (Ed.), Academic Press Professional, 1990. The output of process 100 is an incomplete centerline including a plurality of junction-adjacent centerline segments.

PROCESS 110: The incomplete centerline of process 100 is completed by connecting the centerline segments so as to reflect the most plausible junction structure, typically based on the configuration of the centerline segments leading to the junction rather than on the configuration of the junction area in the raster image.

Figure 5A:
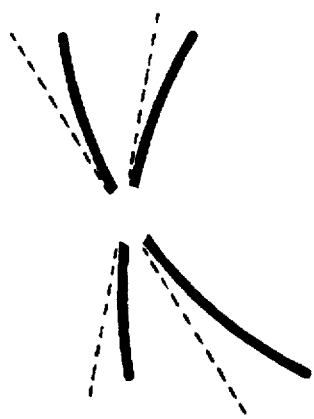
FIG. 5A is a pictorial illustration of an incomplete centerline.
Figure 5B:
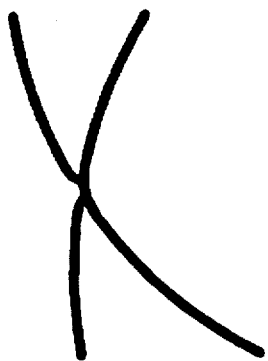
FIG. 5B is a pictorial illustration of an unsuccessful completion of the incomplete centerline of FIG. 5A.
Figure 5C:
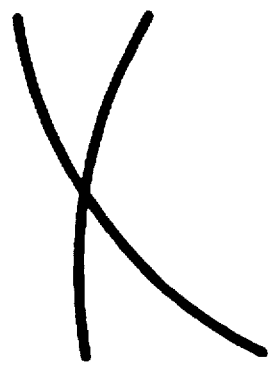
FIG. 5C is a pictorial illustration of a successful completion of the incomplete centerline of FIG. 5A.

Preferably, for each junction which includes at least three junction-adjacent segment ends, pairs of junction-adjacent segment ends are connected so as to minimize angular separation between the tangents to connected junction-adjacent segment ends. FIG. 5A is a pictorial illustration of an incomplete centerline, drawn in solid line. FIG. 5B is a pictorial illustration of an unsuccessful completion, also in solid line, of the incomplete centerline of FIG. 5A. FIG. 5C is a pictorial illustration, also in solid line, of a successful completion of the incomplete centerline of FIG. 5A. As shown, the angular separation between the tangents to connected junction-adjacent segment ends, in FIG. 5C, is less than in FIG. 5B. The tangents are drawn in broken lines.

Figure 3:
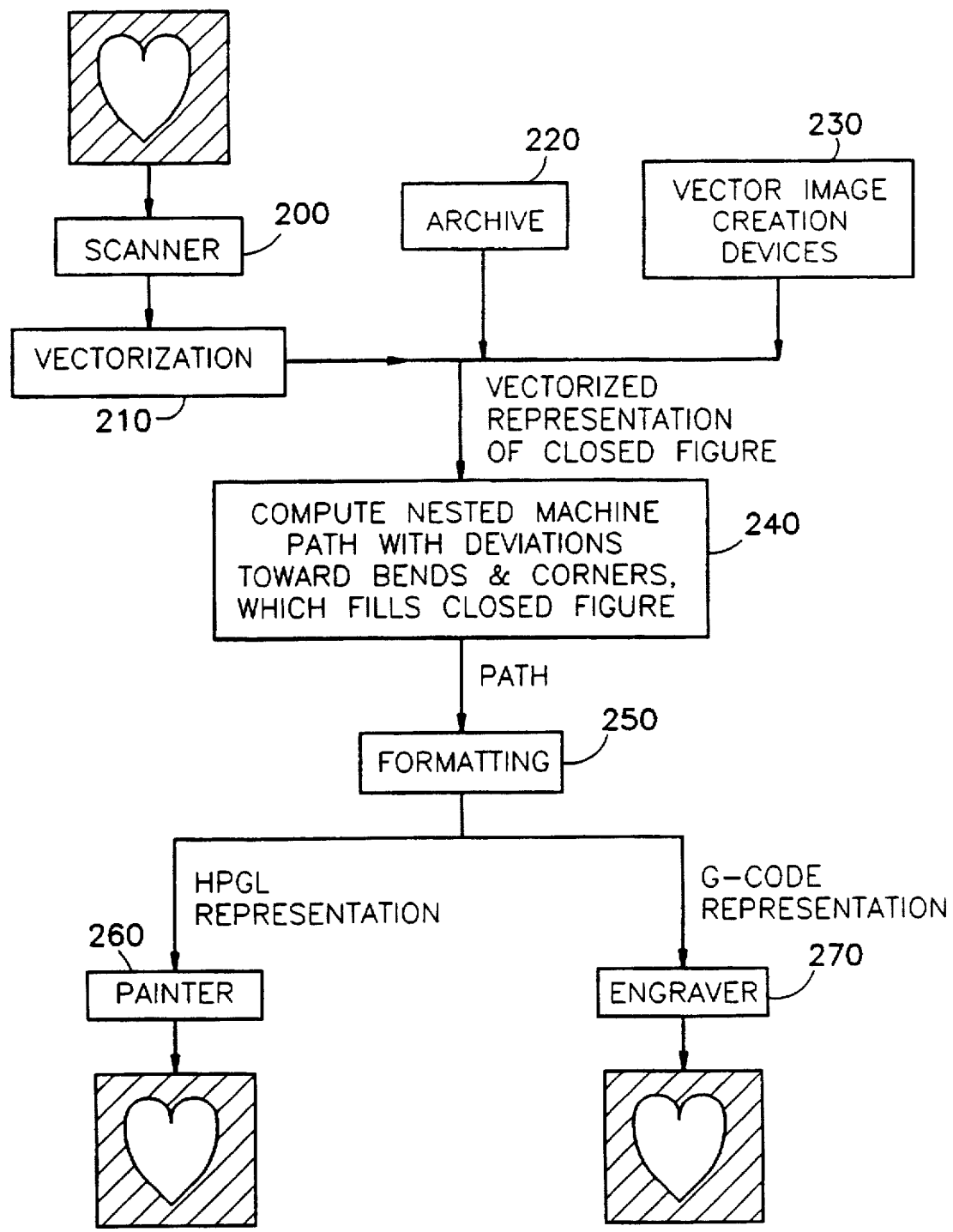
FIG. 3 is a simplified block diagram of a system for physically processing substantially the entirety of a surface area bounded by a closed contour.

Reference is now made to FIG. 3 which is a simplified block diagram of a system for physically processing substantially the entirety of a surface area bounded by a closed contour. The apparatus of FIG. 3 is initially operative to provide a vectorized representation of a closed figure. Any suitable apparatus may be employed to provide the vectorized closed figure such as but not limited to:

a. a local or remote scanner 200 such as an HP ScanJet which scans a graphic representation of a closed figure, in conjunction with a vectorization module 210 such as the Outline Vectorization capability of CASmate, marketed by ScanVec Marketing Inc., 155 West St., Wilmington, Mass., 01887.

b. a local or remote archive 220 such as a hard disk containing a CAD file; or c. a local or remote vector image creation device 230 such as the editing capabilities of the CASmate system.

The vectorized closed figure is received by a machine path computation unit 240 which is operative to compute a nested machine path with deviations toward bends and corners, which machine path substantially fills the closed figure.

The machine path information generated by machine path computation unit 240 is formatted by a formatting unit 250 to achieve compatibility with a surface area processing device which it is desired to employ in order to process substantially the entirety of the surface area. Suitable surface area processing devices include but are not limited to a painter 260 or an engraver 270.

Figure 4:
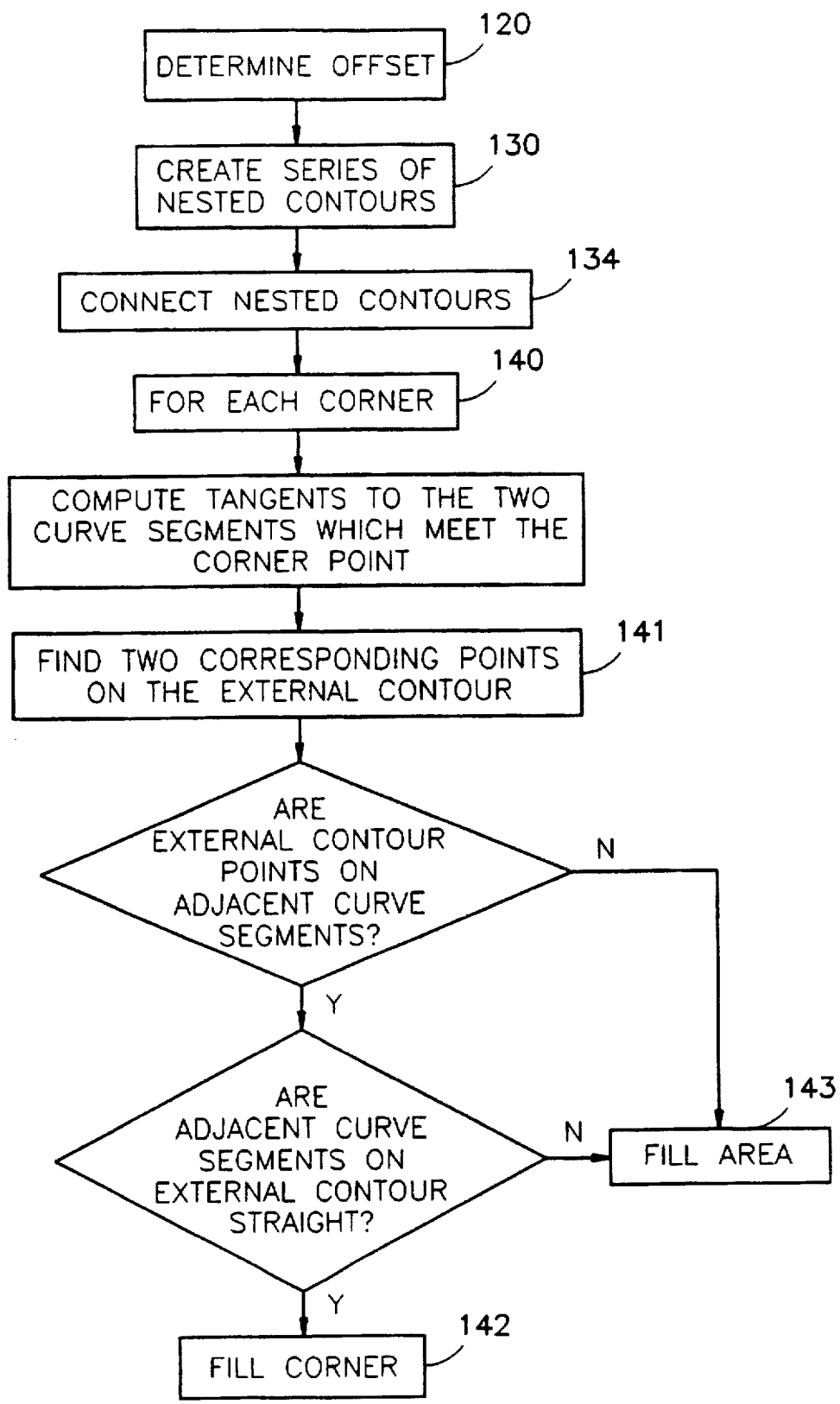
FIG. 4 is a flowchart illustration of the machine path computation block of FIG. 3.

Reference is now made to FIG. 4 which is a flowchart illustration of the machine path computation block 240 of FIG. 3, also termed herein the "island fill" block.

The island fill method of FIG. 4 generates a machine path that covers a contour by a series of recursively nested contours. The nested contours are connected to one another to create a single machine path. Each contour is nested at a fixed offset from the contour containing it. If the contours contain corners, i.e. nondifferentiable points, unfilled pockets remain between the external contour and the internal one, which are "filled" in process 140.

PROCESS 120: The offset between each two nested contours is typically equal to the diameter of the machine tool minus a predetermined overlap.

PROCESS 130: For each contour an internal contour is computed, such that the distance from each point on the internal contour to the closest point on the external contour is equal to the offset computed in process 120. Process 130 is repeated recursively, until it is no longer possible to create an internal contour at the specified offset. Each nested contour is then connected to the one external to it, to create one connected path (process 134).

Figure 6:
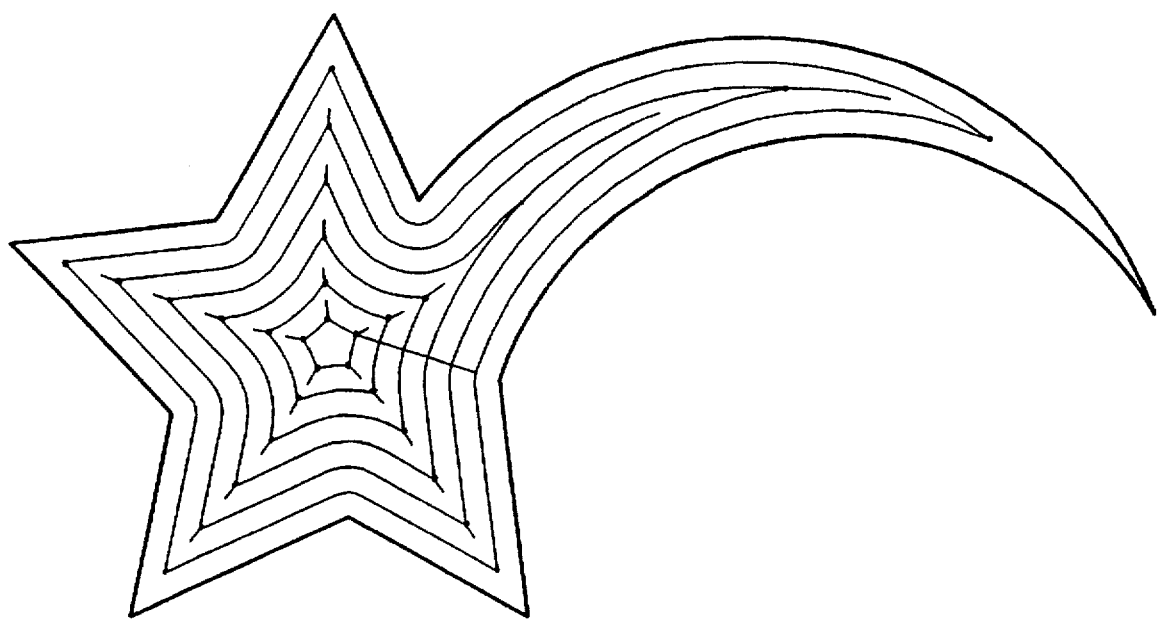
FIG. 6 is a diagram illustrating corner filling.

PROCESS 140: In this process additional line segments are created at the corners of internal contours to guarantee that the corners are covered by the machine path. FIG. 6 is an example of corner filling. Corner filling is performed for each internal contour. For each non-differentiable point on such contour, such as those designated by dots in FIG. 6, the method of process 140 is applied.

Figure 7:
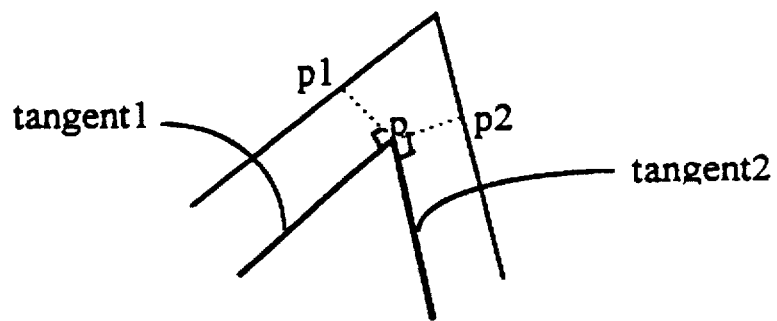
FIG. 7 is a diagram illustrating identification of two points along the current external contour which correspond to the current non-differentiable point along the current internal contour.

In stage 141, two points along the current external contour which correspond to the current non-differentiable point along the current internal contour are identified, as shown in FIG. 7. To identify these points, p1 and p2, for a non-differentiable point p, the perpendiculars to the two tangents to p are extended until they intersect the external contour. The two points of intersection of the two perpendiculars, respectively, with the external contour are termed p1 and p2.

Figure 8:
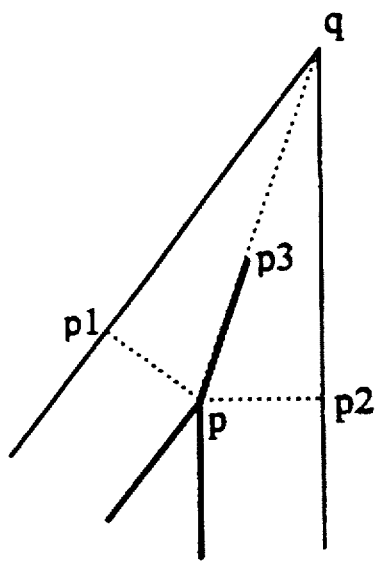
FIG. 8 is a diagram illustrating corner filling for the case illustrated in FIG. 7.

In stage 142, the corner is filled, for the simple case in which p1 and p2 lie on adjacent segments of the external contour and both of the segments on which p1 and p2 are lying are straight. To do this, a point p3 is selected along the line segment connecting the current non-differentiable point p along the current internal contour with the non-differentiable point q along the current external contour, typically the contour adjacent to and outwardly disposed from the current internal contour, as shown in FIG. 8.

Preferred computational implementations of stages 141 and 142 are as follows:

Stage 141:

$$p1.x \leftarrow p.x - \text{offset} * \text{tangent1}[y]$$

$$p1.y \leftarrow p.y + \text{offset} * \text{tangent1}[x]$$

$$p2.x \leftarrow p.x - \text{offset} * \text{tangent2}[y]$$

$$p2.y \leftarrow p.y + \text{offset} * \text{tangent2}[x]$$

Stage 142:

$$dx1 \leftarrow p1.x - p.x$$

$$dx2 \leftarrow p2.x - p.x$$

$$dy1 \leftarrow p1.y - p.y$$

$$dy2 \leftarrow p2.y - p.y$$

$$t \leftarrow (dy2*(p2.y - p1.y) + dx2*(p2.x - p1.x))/(dy1*dx2 - dy2*dx1)$$

$$p3.x \leftarrow p1.x + t*dy1$$

$$p3.y \leftarrow p1.y - t*dx1$$

$$dx1 \leftarrow p3.x - p.x$$

$$dy1 \leftarrow p3.y - p.y$$

$$d \leftarrow \sqrt{dx1^2 + dy1^2}$$

$$n \leftarrow 0.5*(1 - ABS(\text{offset})/d)$$

$$p3.x \leftarrow p.x + n*dx1$$

$$p3.y \leftarrow p.x + n*dy1$$

In the above computational definitions, tangent1[y] is the y-component of a one unit long segment of the first tangent to the non-differentiable point. Tangent1[x] is the x-component of a one unit long segment of the first tangent to the non-differentiable point. Analogous names are used for tangent2, the second tangent to the non-differentiable point.

A deviation up and down the line segment connecting p to p3 is added to the machine path.

It is appreciated that the deviation from p to p3 is exactly retraced, i.e. the return from p3 to p coincides exactly with the advance from p to p3. Alternatively, the return from p3 to p coincides only partly with the advance from p to p3. In the prior art, as illustrated in FIG. BA-9, the deviation path and the return path only intersect and do not even partly coincide.

Figure 9:
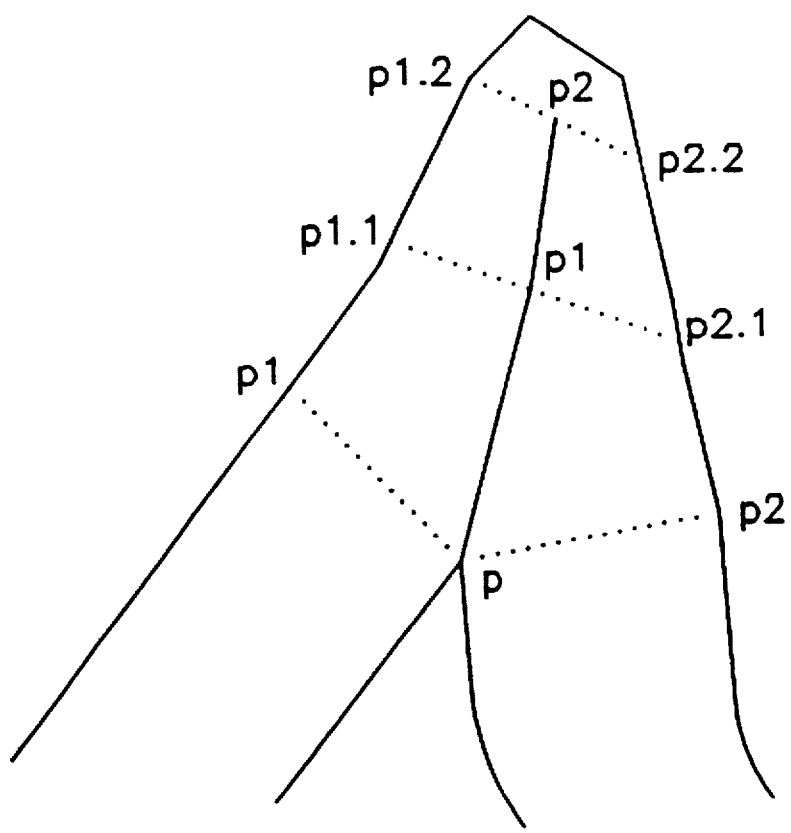
FIG. 9 is a diagram illustrating corner filling for a more complex case.
Figure 10:
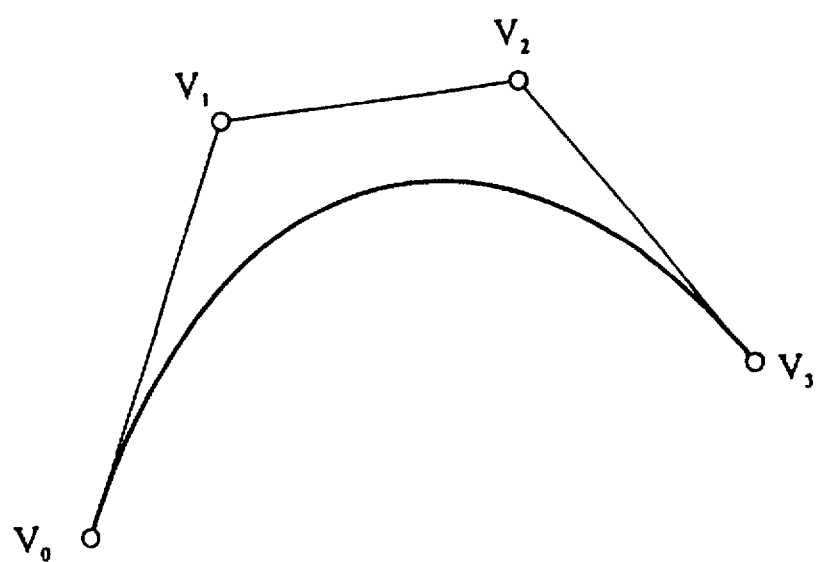
Figure 11:
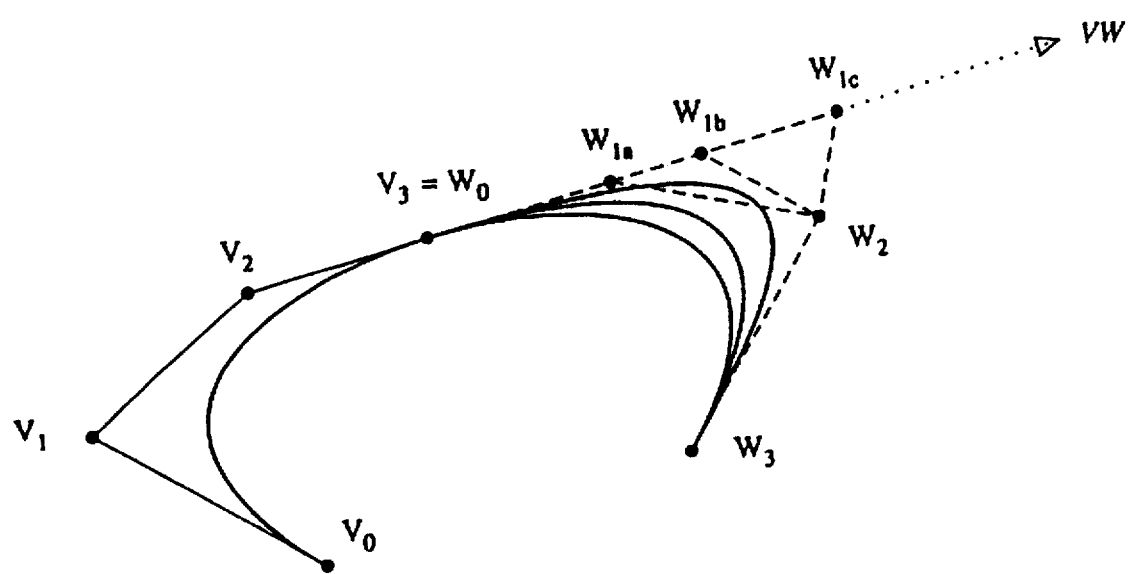
Figure 12:
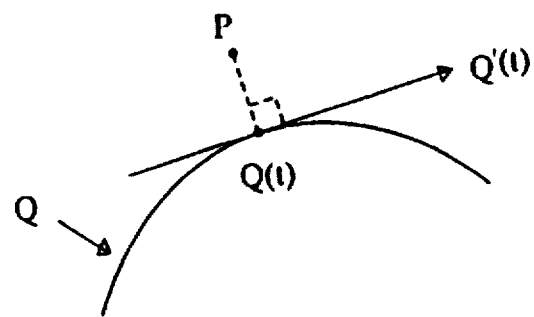
Figure 13:
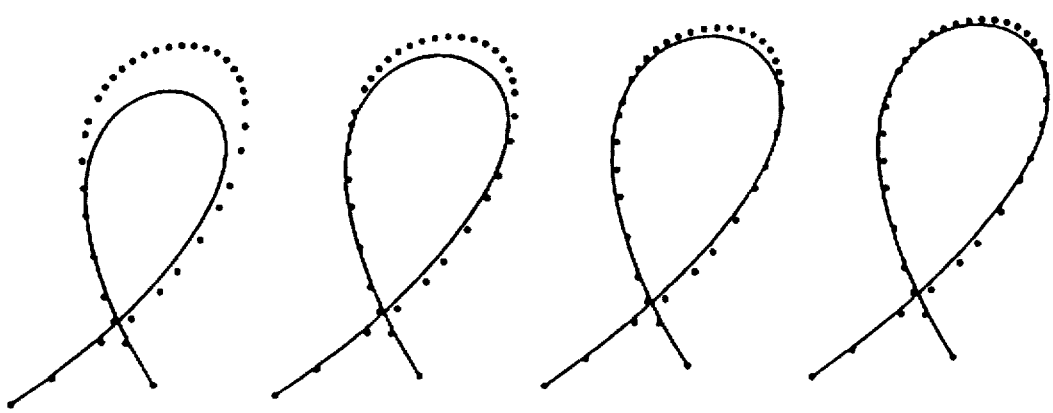
Figures 16, 17:
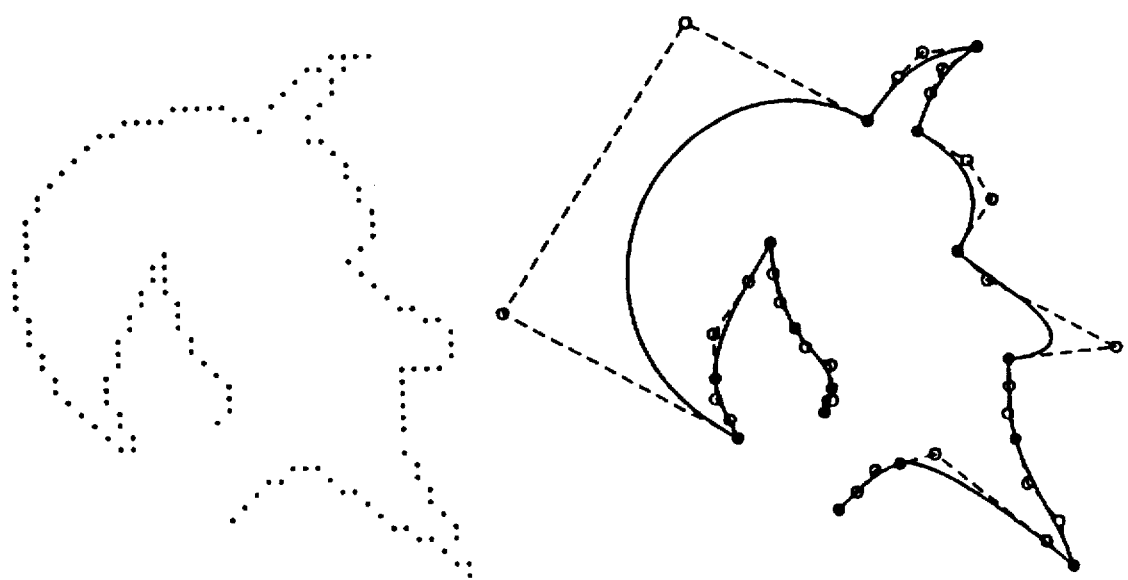
Figure 18:
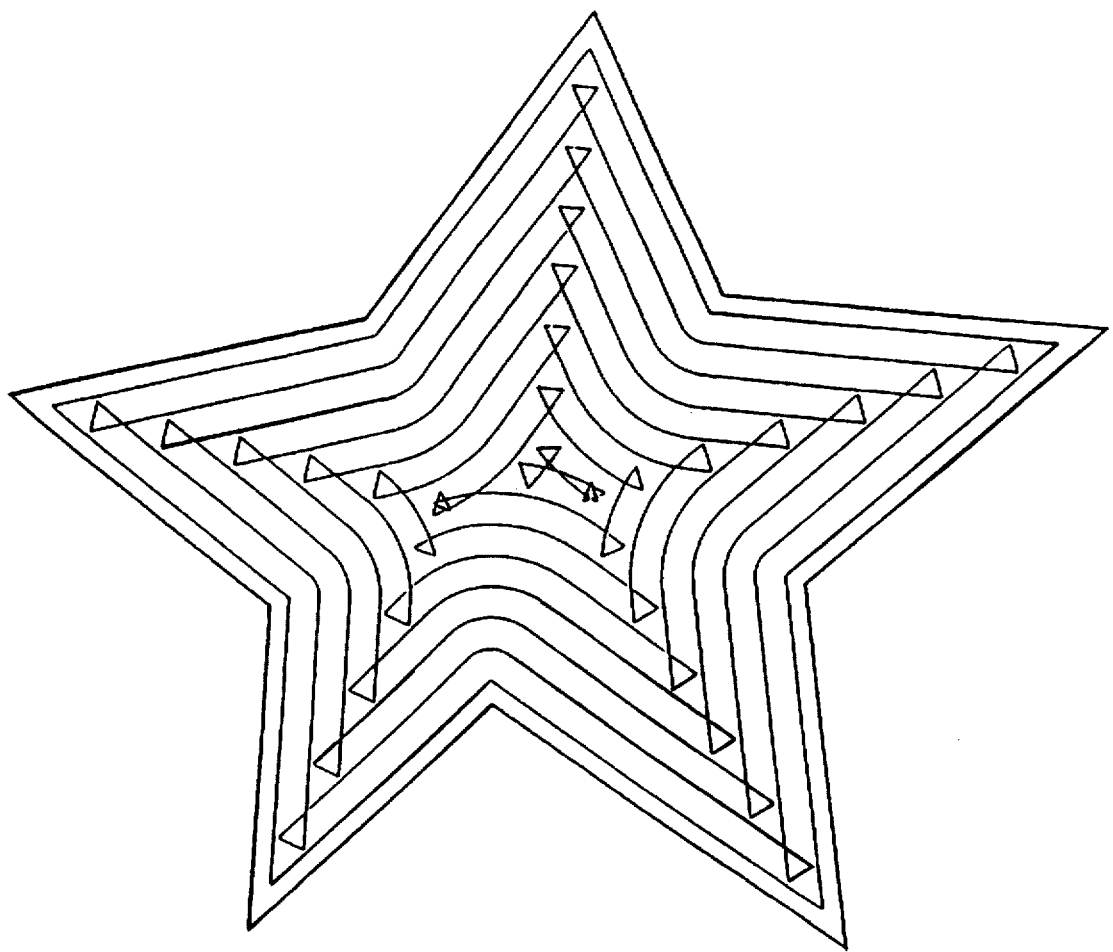
FIG. 18 is a graphic illustration of a conventional method for filling an area in which deviations toward bends are provided and in which the return path from the deviation does not even partly coincide with the deviation itself.

Stage 143 is similar to stage 142 except that the geometry is more complex because p1 and p2 lie on nonadjacent segments of the external contour and/or one or both of the segments on which p1 and p2 are lying are curved rather than straight. Stage 143 is most easily understood with reference to FIG. 9 which illustrates treatment of a corner with complex geometry. As shown, p1 and p2 are computed as in stage 142. Next, an additional pair of points p1.1 and p2.1 along the external contour are identified which are en route from p1 and p2, respectively, to the external contour corner q and are at a predetermined distance d from p1 and p2 respectively. If the distance between p1.1 and p2.1 exceeds the selected offset, then the midpoint, p.1, of the line interconnecting p1.1 and p2.1 is found and a path segment from p to p.1 and back is added to the machine path.

The above-described process of finding an additional pair of points and extending the path to include the midpoint of their connecting line is continued until the distance between the points is less than the selected offset. In the illustrated example, an additional pair p1.2 and p2.2 is found, the distance between which still exceeds the selected offset, and the machine path is extended to include the midpoint p.2 of their connecting line. The process is then terminated because the next pair to be found are sufficiently close together.

A preferred software implementation of processes 60, 80, 90 and 110 of FIG. 2, in pseudo-code, is as follows:

PROCESS 60

Compute Average Thickness

```
threshold←number_gray_levels/2
black_count←0
total_black_count←0
edge_count←0
do for each raster line
    do for each pixel in line
        if pixel_value<threshold then
            if black_count=0 then
                edge_count←edge_count+1
            endif
            black_count←black_count+1
            total_black_count←total_black_count+1
            mark pixel as "black"
        else
            if black_count>0 then
                edge_count←edge_count+1
                black_count←0
            endif
        endif
    end
end
average_thickness←total_black_count/edge_count
```

PROCESS 80

Detect Junctions

```
do for each skeleton point
    transition_count←0
    do for each p[i] (i:=0..7)
        if p[i]≠p[i+1 mod 8] then
            transition_count←transition_count+1
        endif
    end
    edge_count←transition_count/2
    if edge_count≠2 then
        mark this pixel as junction
    endif
```

PROCESS 90

Compute Center Points

```
do for each skeleton pixel (x,y)
    range←number_gray_levels-1
    width←0; x'←x-1
    while pixel_value(x',y)<threshold do
        x'←x'-1
        width←width+1
    end
    left←x'+1-[pixel_value(x',y)-pixel_value(x'+1,y)]/
        range
    x'←x+1
    while pixel_value(x',y)<threshold do
        x'←x'+1
        width←width+1
    end
    right←x'-1+[pixel_value(x',y)-pixel_value(x'-1,y)]/
        range
    X_center←(right+left)/2
    height←0; y'←y-1
    while pixel_value(x,y')<threshold do
        y'←y'-1
        height←height+1
    end
    bottom←y'+1-[pixel_value(x,y')-pixel_value(x,y'+1)]/
        range
    y'←y+1
    while pixel_value(x,y')<threshold do
        y'←y'+1
        height←height+1
    end
    top←y'-1+[pixel_value(x,y')-pixel_value(x,y'-1)]/
        range
    Y_center←(top+bottom)/2
    if width≦average_thickness and height≦average_
       thickness then
        if width<height then
            make point at (X_center, y+0.5)
        else
            make point at (x+0.5, Y_center)
        endif
    endif
end
```

PROCESS 110

Connect Junctions

```
do for each junction
    do for each line segment adjacent to the junction
        calculate the tangent to the line at its endpoint
    end
    do for each endpoint i adjacent to junction
        do for each endpoint j (j≠i)
            calculate angle between i-tangent and j-tangent
        end
        find endpoint j such that i-j angle is closest to 180°
    end
    sort (i,j) endpoint couples according to angle (by close-
        ness to 180°)
    do for each endpoint couple (i,j) in sorted array
        if i is not connected then
            if j is not connected then
                create line segment connecting i-j to best fit their
                    tangents
                mark j as connected
            else /* j is connected to another endpoint k */
                create line segment from i line j-k at i-tangent
                    direction
            endif
            mark i as connected
``` endif
end
end

The pseudocode for process 80 employs the following notation to denote the neighbors of a pixel p:

p[2] p[3] p[4]
p[1] p p[5]
p[0] p[7] p[6]

In the present specification, the term "cornerpoint" is used to mean a nondifferentiable location on a curve.

It is appreciated that the software components of the present invention may, if desired, be implemented in ROM (read-only memory) form. The software components may, generally, be implemented in hardware, if desired, using conventional techniques.

The apparatus and methods described herein are implemented in the CASmate, marketed by ScanVec Marketing Inc., 155 West St., Wilmington, Mass., 01887.

The following paragraphs are a direct quote of the disclosure of Schneider as regards curve-fitting:

Introduction

A new curve-fitting method is introduced. This adaptive algorithm automatically (that is, with no user intervention) fits a piecewise cubic Bézier curve to a digitized curve; this has a variety of uses, from drawing programs to creating outline fonts from bitmap fonts. Of particular interest is the fact that it fits geometrically continuous ($G^i$) curves, rather than parametrically continuous ($C^1$) curves, as do most previous approaches.

Curve fitting has been the subject of a fair amount of attention, even before computer graphics came along. The term spline comes from drafting jargon: to draw a smooth curve passing through a set of points, the draftsman would place a weight (also a term that has survived into CAGD methods) on each point, and then place a flexible wooden strip (the spline) onto the weights. The spline had slots running lengthwise, which fitted onto the top of the weights, allowing the spline to assume a "natural" and smooth shape. Pavlidis (1983) notes that theories of mechanical elasticity can be used to show that such spline curves exhibit $C^2$ continuity, and are equivalent to piecewise cubic polynomial curves. Because of this, piecewise polynomial curves are referred to as splines, and such curves have been used to mathematically interpolate discrete data sets. Readers interested in interpolation should consult any numerical analysis text, such as Conte and deBoor (1972), or Bartels et al. (1987).

This article discusses a method for approximation of digitized curves with piecewise cubic Bézier segments. Such an algorithm is useful in interactive drawing systems, converting bitmapped or otherwise digitized figures (such as fonts) to a parametric curve representation, and the like.

Many techniques have been brought to bear on the problem of this type or curve-fitting: splines (Reinsch, 1967; Grossman, 1970); purely geometric methods (Flegal cited in Reeves, 1981); B-splines (Yamaguchi, 1978; Wu et al., 1977; Giloi, 1978; Lozover and Preiss, 1981; Yang et al., 1986; Dierckx, 1982; Vercken et al., 1987; Ichida et al., 1977; Chong, 1980); hermite polynomials (Plass and Stone, 1983); hyperbolic splines in tension (Kozak, 1986; Schweikert, 1966; Cline, 1974); cubic splines in tension (Cline, 1974; Dube, 1987; Schweikert, 1966); conic sections (Bookstein, 1979); conic splines (Pavlidis, 1983); conic arcs and straight-line segments (Albano, 1974); and circular arcs and straight-line segments (Piegl, 1986). A more detailed description of these solutions may be found in Schneider (1988) and Reeves (1981).

However, each of these approaches has some shortcoming—some of the earlier methods apply only to scalar functions, many require a great deal of intervention by the user, some produce representations that are inappropriate for free-form curves (for example, circular arcs and straight-line segments), and all of the parametric polynomial methods but Plass and Stone's (1983) produce curves that are parametrically continuous, but they note of their method that ". . . it sometimes does not converge at all."

Bézier Curves

The curve representation that is used in this algorithm in approximating the digitized curve is the Bézier curve. Accordingly, we briefly review the basics: the curves known as Bézier curves were developed (independently) in 1959 by P. de Casteljau and in 1962 by P. Bézier. Numerous references exist; see Boehm et al., (1984) and Davis (1975). A Bézier curve of degree n is defined in terms of Bernstein polynomials:

$$Q(t) = \sum_{i=0}^{n} V_i B_i^n(t), \; t \in [0,1],$$

where the $V_i$ are the control points, and the $B_i^n(t)$ are the Bernstein polynomials of degree n.

$$B_i^n(t) = \binom{n}{i} t^i (1-t)^{n-i}; \; i=0, \ldots, n,$$

where $\binom{n}{i}$ is the binomial coefficient $n!/(n-i)!i!$. See FIG. 1 for an example of a cubic Bézier curve. Bézier curves generally are evaluated using a recursive algorithm due to de Casteljau. The algorithm is based on the recursion property of Bernstein polynomials:

$$B_i^n(t) = (1-t)B_i^{n-1} + t B_{i-1}^{n-1}(t).$$

The kth derivative of a Bézier curve is given by $$\frac{d^k}{dt^k} Q(t) = \frac{n!}{(n-k)!} \sum_{i=0}^{n-k} \Delta^k V_i B_i^{n-k}(t),$$

where $\Delta^1 V_i = \Delta V_i = V_{i+1} - V_i$, and where $\Delta^k V_i = \Delta^{k-1} V_{i+1} - \Delta^{k-1} V_i$, (Watkins, 1987; Boehm et al., 1984). Thus, for t=0 (the left endpoint), $$\frac{d^k}{dt^k} Q(0) = \frac{n!}{(n-k)!} \Delta^k V_0.$$

For k=1, $$\frac{dQ}{dt} = Q'(t) = n \sum_{i=0}^{n-1} (V_{i+1} - V_i) B_i^{n-1}(t),$$

which makes more obvious the fact that the tangent vector direction (at the left of the segment) is determined by the line segment from $V_0$ to $V_1$. A similar condition holds for the right end.

The implication of this fact is that to enforce continuity at the joints, the second-to-last control point of one segment must be collinear with the last control point (which is also the first control point of the adjoining segment) and the second control point of the adjoining segment. See FIG. 2 for an example; the second control point of the right-hand segment (the one with control points $W_i$) must be located along the half-line labeled VW.

Any sort of complete treatment of continuity conditions is well beyond the scope of this article—interested readers may wish to consult DeRose (1985). Briefly, we note that if the distance between the control point on the left side of the joint and the shared control point is equal to the distance between the shared control point and its neighbor on the right, the tangent vectors will be equal in magnitude and direction. This condition is known as parametric continuity, denoted $C^1$. However, for many applications, this is too restrictive—notice that for the joint to appear smooth, all that is required is that only the tangent directions be equivalent, a condition known as geometric continuity, denoted $G^1$. Getting back to the figure, this implies that the shared control point and its two neighbors need only be colinear—the respective distances do not affect the appearance of smoothness at the joint. The curve-fitting algorithm exploits this extra degree of freedom—we employ a least-squares fitting method, which sets these distances so that the error (that is, distance) between the digitized points of the fitted curve is minimized. This has several advantages: first, we can fit the curve with fewer segments; second, parametrically continuous curves correspond to the family of curves drawn by the motion of a particle that moves at a continuous velocity. This is a too much of a restriction for bitmapped fonts, for example; for hand-drawn curves, the restriction is patently wrong.

Fitting the Curve

Following Plass and Stone (1983), a parametric curve $Q(t)$ can be thought of as the projection of a curve in X, Y, t space onto the X-Y plane. Then, we can think of the problem as finding the curve in X, Y, t space whose projection best approximates the digitized curve in the X-Y lane. "Best" is defined in terms of minimization of the sum of squared distances from the digitized curve to the parametric curve.

We state without proof that the curves defined by the projections of the 3-space curve on the X-t and Y-t planes are single-valued (scalar) curves. Thus, if one could devise some scheme relating the X and Y coordinates of each point, one could apply a conventional least-squares function-fitting technique, with the addition constraints of tangent vector direction considered, in X and Y simultaneously. As we are working with parametric representations, the "scheme" relating the X and Y coordinates is the parametric value t associated with each point. As none are provided, we must look for a way to estimate accurately a value of t for each digitized point. A traditional approach to this problem is to use chord-length parameterization.

Once each point has an associated t-value, we can fit a cubic Bézier segment to the set of points (a process described later), and compute the error by comparing the distances between each digitized point $p_k$ and the point with parametric value $t_k$ on the generated curve.

The square distance between a given point P and a point $Q(t)$ on a parametric curve Q is $$\text{dist} = \|P - Q(t)\|. \tag{1}$$

Refer to FIG. 3 for a diagram of this. The general problem can be stated in this manner: given a set of points in the plane, find a curve that fits those points to within some given tolerance. In our case, the curve with which we wish to approximate the points is a cubic Bernstein-Bézier curve, and our fitting criterion is to minimize the sum of the squared distances from the points to their corresponding points on the curve. Formally, we wish to minimize a function S, where S is defined by $$S = \sum_{i=1}^{n} [d_i - Q(u_i)]^2 \tag{2}$$

$$= \sum_{i=1}^{n} [d_i - Q(u_i)] \cdot [d_i - Q(u_i)], \tag{3}$$

where $d_i$ are the (x, y) coordinates of the given points, and $u_i$ is the parameter value associated with $d_i$.

In the next set of equations, the following definitions hold:

$V_0$ and $V_3$, the first and last control points, are given—they are set to be equal to the first and last digitized points in the region we are trying to fit.

$\hat{t}_1$ and $\hat{t}_2$ are the unit tangent vectors at $V_0$ and $V_3$, respectively.

$V_1 = \alpha_1 \hat{t}_1 + V_0$, and $V_2 = \alpha_2 \hat{t}_2 + V_3$; that is, the two inner control points are each some distance $\alpha$ from their the nearest end control point, in the tangent vector direction.

Recall that as we are enforcing $G^1$ continuity, $V_1$ and $V_2$ can be placed anywhere along the half-lines defined by $\hat{t}_1$ and $\hat{t}_2$, respectively. Our problem can be defined as finding $\alpha_1$ and $\alpha_2$ to minimize S. That is, we wish to solve these two equations for $\alpha_1$ and $\alpha_2$, thereby determining the remaining two control points (that is, $V_1$ and $V_2$) of the cubic Bézier segment:

$$\frac{\partial S}{\partial \alpha_1} = 0 \tag{4}$$

$$\frac{\partial S}{\partial \alpha_2} = 0. \tag{5}$$

Expanding Eq. (4), $$\frac{\partial S}{\partial \alpha_1} = \sum_{i=1}^{n} 2[d_i - Q(u_i)] \cdot \frac{\partial Q(u_i)}{\partial \alpha_1}.$$

Expanding the second term, we get $$\frac{\partial Q(u_i)}{\partial \alpha_1} = \frac{\partial}{\partial \alpha_1} (V_0 B_0^3(u_i) + (\alpha_1 \hat{t}_1 + V_0) B_1^3(u_i) + (\alpha_2 \hat{t}_2 + V_3) B_2^3(u_i) + V_3 B_3^3(u_i))$$

$$= \hat{t}_1 B_1^3(u_i).$$

Thus, $$\frac{\partial S}{\partial \alpha_1} = \sum_{i=1}^{n} 2[d_i - Q(u_i)] \cdot \hat{t}_1 B_1^3(u_i) = 0.$$

Rearranging, we get $$\sum_{i=1}^{n} B_1^3(u_i) Q(u_i) \cdot \hat{t}_1 = \sum_{i=1}^{n} \hat{t}_1 B_1^3(u_i) \cdot d_i.$$

For convenience, define $$A_{i,1} = \hat{t}_1 B_1^3(u_i).$$

Then, $$\sum_{i=1}^{n} Q(u_i) \cdot A_{i,1} = \sum_{i=1}^{n} d_i \cdot A_{i,1}. \quad (6)$$

Expanding $Q(u_i)$, $$\sum_{i=1}^{n} Q(u_i) \cdot A_{i,1} = \sum_{i=1}^{n} A_{i,1} \cdot (V_0 B_0^3(u_i) + \alpha_1 A_{i,1} + V_0 B_1^3(u_i) +$$

$$\alpha_2 A_{i,2} + V_3 B_2^3(u_i) + V_3 B_3^3(u_i))$$

$$= \sum_{i=1}^{n} A_{i,1} \cdot V_0 B_0^3(u_i) + \alpha_1 \sum_{i=1}^{n} A_{i,1}^2 +$$

$$\sum_{i=1}^{n} A_{i,1} \cdot V_0 B_1^3(u_i) + \alpha_2 \sum_{i=1}^{n} A_{i,1} \cdot A_{i,2} +$$

$$\sum_{i=1}^{n} A_{i,1} \cdot V_3 B_2^3(u_i) + \sum_{i=1}^{n} A_{i,1} \cdot V_3 B_3^3(u_i)$$

Equation (6) becomes $$\left( \sum_{i=1}^{n} A_{i,1}^2 \right) \alpha_1 + \left( \sum_{i=1}^{n} A_{i,1} \cdot A_{i,2} \right) \alpha_2 =$$

$$\sum_{i=1}^{n} (d_i - (V_0 B_0^3(u_i) + V_0 B_1^3(u_i) + V_3 B_2^3(u_i) + V_3 B_3^3(u_i))) \cdot A_{i,1}$$

Similarly, for $\partial S / \partial \alpha_2$, $$\left( \sum_{i=1}^{n} A_{i,1} \cdot A_{i,2} \right) \alpha_1 + \left( \sum_{i=1}^{n} A_{i,2}^2 \right) \alpha_2 =$$

$$\sum_{i=1}^{n} (d_i - (V_0 B_0^3(u_i) + V_0 B_1^3(u_i) + V_3 B_2^3(u_i) + V_3 B_3^3(u_i))) \cdot A_{i,2}$$

If we represent the previous two equations by $$c_{1,1}\alpha_1 + c_{1,2}\alpha_2 = X_1$$
$$c_{2,1}\alpha_1 + c_{2,2}\alpha_2 = X_2,$$

we need only solve $$\begin{pmatrix} c_{1,1} & c_{1,2} \\ c_{2,1} & c_{2,2} \end{pmatrix} \begin{pmatrix} \alpha_1 \\ \alpha_2 \end{pmatrix} = \begin{pmatrix} X_1 \\ X_2 \end{pmatrix}$$

for $\alpha_1$ and $\alpha_2$. If we let $$\mathcal{C} = \begin{pmatrix} c_{1,1} & c_{1,2} \\ c_{2,1} & c_{2,2} \end{pmatrix} = (C_1 \; C_2)$$

$$\mathcal{X} = \begin{pmatrix} X_1 \\ X_2 \end{pmatrix},$$

Then, using Cramer's Rule, the solution to $$\begin{pmatrix} \alpha_1 \\ \alpha_2 \end{pmatrix} = \mathcal{C}^{-1} \mathcal{X}$$

is $$\alpha_1 = \frac{\det(\mathcal{X} \; C_2)}{\det(C_1 \; C_2)}$$

$$\alpha_1 = \frac{\det(C_1 \; \mathcal{X})}{\det(C_1 \; C_2)}$$

Our algorithm that attempts to fit a single cubic Bézier segment to a set of points appears in FIG. 4. We begin by computing approximate tangents at the endpoints of the digitized curve. This can be accomplished by fitting a least-squares line to the points in the neighborhood of the endpoints, or by averaging vectors from the endpoints to the next n points, and so on. Next, we assign an initial parameter value $u_i$ to each point $d_i$, using chord-length parameterization. At this point, we use the technique described to fit a cubic Bézier segment to the points—the first and last control points are positioned at the first and last digitized points in the region we are working on, and the inner two control points are placed a distance $\alpha_1$ and $\alpha_2$ away from the first and last control points, in the direction of the unit tangent vectors previously computed. We then compute the error between the Bézier curve and the digitized points, noting the point that is the farthest distance from the curve. If the fit is acceptable, we draw or otherwise output the curve. If the fit is not acceptable, we could break the digitized points into two subsets at the point of greatest error, compute the unit tangent vector at the point of splitting, and recursively try to fit Bézier curves to these two new subcurves. Consider, though, that our initial chord-length parameterization is only a very rough approximation; if we had a better parameterization of the points, we might have been able to fit the curve without further recursive processing. Fortunately, there is a technique available to us. Referring back to Eq. 1, our t is that chord-length-generated approximate parameter. We can use Newton-Raphson iteration to get a better t—in general, the formula is $$t \leftarrow t - \frac{f(t)}{f'(t)}. \quad (7)$$

Referring back to FIG. 3, we wish to solve $$[Q(t)-P]\cdot Q'(t)=0 \quad (8)$$

for t. In our case, then, we reduce the t for each point by $$\frac{Q_1 t \cdot Q_2 t}{[Q_1(t) \cdot Q_2(t)]'}. \quad (9)$$

This technique was first used by Grossman (1970) and later by Plass and Stone (1983) in their algorithms. This iteration can greatly improve the fit of the curve to the points: see FIG. 5, for an example of the process.

Newton-Raphson iteration is fairly inexpensive and tends to converge rather quickly. Thus, one might want to attempt this improvement every time. However, if the initial fit is very poor, it may be best not even to attempt the improvement. So, we compare the error to some value ψ, which we set to some small multiple or power of the user-specified error ε. This value ψ is implementation-dependent, but is easy to determine empirically. Additionally, since the incremental improvement decreases quickly with each successive iteration, we set a limit on the number of attempts we make (the author found that a value of four or five is appropriate). Finally, we note that while this Newton-Raphson iteration is cheap, the associated fitting attempts are not. The astute reader may notice, then, that we have placed more emphasis on minimizing the number of segments generated than on execution speed. Even so, the algorithm is generally more than fast enough for interactive use, even with a very large number of points to fit. In addition, it is very stable—the author has not seen a case when the algorithm failed to converge quickly on a satisfactory and correct fit.

One final note: the least-squares mathematics fails when there are only two points in the digitized subcurve to be fitted. In this case, we adopt a method from Schmitt et al., (1986), and plane the inner two control points at a distance from the outer two control points equal to one-third of the distance between the two points, along the unit tangents at each endpoint.

Examples of the fitting algorithm being applied to a digitized font and to a hand-sketched curve appear in FIGS. 6 and 7. The large dots indicate the cubic Bézier control points—the filled dots are the first and last control points in each curve (which are shared with the curve's neighbors), and the hollow dots are the "inner" control points.

Implementation Notes

Several points should be made with respect to implementation. First, the implementor may want to preprocess the digitized data prior to calling the fitting routine. Such preprocessing might include: removing coincident and/or nearly coincident data points, filtering the points with a little convolution (makes tangent computation more reliable), and locating corners. By "corners" we mean regions in the digitized curve where there should be a discontinuity; such points can be located by looking at the angle created by a point and its neighbors. These corners divide the original curve into a number of distinct subcurves, each of which can be fitted independently. Second, negative $\alpha$ values occasionally are generated when the points are very irregularly spaced. In this case, one can either split the points and try to fit each subcurve, or employ the heuristic mentioned earlier.

A sample C implementation of the algorithm is included in the appendix, in the file fit_cubic.c. Inputs to the routine FitCurve are the array of digitized points, their number, and the desired (squared) error value. When Bézier curves are generated, the routine DrawBezierCurve is called to output the curve; this routine must be supplied by the implementor, and simply consists of drawing or otherwise outputting the curve defined by the control points with which it is called.

The quote from Schneider's disclosure ends here. FIGS. 1–3 and 5–7B referenced in Schneider are FIGS. 10 to 12, and 13 to 17 of the present application. The four curves in FIG. 5 are, from left to right, for chord-length parameterization, and for one, two and three iterations, respectively. The sample C implementation referred to in the last paragraph of Schneider is Appendix A of the present application. FIG. 4 of Schneider is Appendix B of the present application.

It is appreciated that the apparatus of FIG. 1 is suitable, for example, for generating, for archival and future retrieval for CAD (computer aided design) purposes, a vector representation of a mechanical sketch.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

Appendix A

```
/* fit_cubic.c   */
/* Piecewise cubic fitting code   */ include <stdio.h>
include <malloc.h>
#include <math.h>
#include "2d.h"

typedef Point2 *BezierCurve;

/* Forward declarations */
        void        FitCurve();
static  void        FitCubic();
```

```
static  double      *Reparameterize();
static  double      NewtonRaphsonRootFind();
static  Point2      Bezier();
static  double      B0(), B1(), B2(), B3();
static  Vector2     ComputeLeftTangent();
static  Vector2     ComputeRightTangent();
static  Vector2     ComputeCenterTangent();
static  double      ComputeMaxError();
static  double      *ChordLengthParameterize();
static  BezierCurve GenerateBezier();
static  Vector2     V2AddII();
static  Vector2     V2ScaleII();
static  Vector2     V2Sub();

define MAXPOINTS   1000        /* The most points you can have */ ifdef TESTMODE
```

```
/*
 *  main:
 *  Example of how to use the curve-fitting code.  Given an array
 *  of points and a tolerance (squared error between points and
 *  fitted curve), the algorithm will generate a piecewise
 *  cubic Bezier representation that approximates the points.
 *  When a cubic is generated, the routine "DrawBezierCurve"
 *  is called, which outputs the Bezier curve just created
 *  (arguments are the degree and the control points, respectively).
 *  Users will have to implement this function themselves
 *  ascii output, etc.
 */
main()
{
    static Point2 d[7] = {    /* Digitized points */
        { 0.0, 0.0 },
        { 0.0, 0.5 },
        { 1.1, 1.4 },
        { 2.1, 1.6 },
        { 3.2, 1.1 },
        { 4.0, 0.2 },
        { 4.0, 0.0 },
    };
    double error = 4.0;       /*  Squared error */
    FitCurve(d, 7, error);    /*  Fit the Bezier curves */
}
#endif                         /* TESTMODE */
```

```
/*
 *  FitCurve :
 *      Fit a Bezier curve to a set of digitized points
 */
void FitCurve(d, nPts, error)
    Point2  *d;         /*  Array of digitized points      */
    int     nPts;       /*  Number of digitized points     */
    double  error;      /*  User-defined error squared     */
{
    Vector2  tHat1, tHat2;    /*  Unit tangent vectors at endpoints  */ tHat1 = ComputeLeftTangent(d, 0);
    tHat2 = ComputeRightTangent(d, nPts - 1);
    FitCubic(d, 0, nPts - 1, tHat1, tHat2, error);
}
```

```
/*
 *  FitCubic :
 *      Fit a Bezier curve to a (sub)set of digitized points
 */
static void FitCubic(d, first, last, tHat1, tHat2, error)
    Point2  *d;             /* Array of digitized points */
    int     first, last;    /* Indices of first and last pts in region */
    Vector2 tHat1, tHat2;   /* Unit tangent vectors at endpoints */
    double  error;          /* User-defined error squared         */
{
    BezierCurve bezCurve;   /*Control points of fitted Bezier curve*/
    double      *u;         /* Parameter values for point */
    double      *uPrime;    /* Improved parameter values */
    double      maxError;   /* Maximum fitting error */
    int         splitPoint; /* Point to split point set at */
    int         nPts;       /* Number of points in subset */
    double      iterationError; /*Error below which you try iterating */
    int         maxIterations = 4; /* Max times to try iterating */
    Vector2     tHatCenter; /* Unit tangent vector at splitPoint */
    int         i;

iterationError = error * error;
    nPts = last - first + 1;
```

```
/*  Use heuristic if region only has two points in it */
if (nPts == 2) {
    double dist = V2DistanceBetween2Points(&d[last], &d[first]) /
            3.0;

bezCurve = (Point2 *)malloc(4 * sizeof(Point2));
    bezCurve[0] = d[first];
    bezCurve[3] = d[last];
    V2Add(&bezCurve[0], V2Scale(&tHat1, dist), &bezCurve[1]);
    V2Add(&bezCurve[3], V2Scale(&tHat2, dist), &bezCurve[2]);
    DrawBezierCurve(3, bezCurve);
    return;
}

/*  Parameterize points, and attempt to fit curve */
u = ChordLengthParameterize(d, first, last);
bezCurve = GenerateBezier(d, first, last, u, tHat1, tHat2);

/*  Find max deviation of points to fitted curve */
maxError = ComputeMaxError(d, first, last, bezCurve, u,
        &splitPoint);
if (maxError < error) {
    DrawBezierCurve(3, bezCurve);
    return;
}
```

```
    /* If error not too large, try some reparameterization */
    /* and iteration */
    if (maxError < iterationError) {
        for (i = 0; i < maxIterations; i++) {
            uPrime = Reparameterize(d, first, last, u, bezCurve);
            bezCurve = GenerateBezier(d, first, last, uPrime, tHat1,
                    tHat2);
            maxError = ComputeMaxError(d, first, last,
                    bezCurve, uPrime, &splitPoint);
            if (maxError < error) {
                DrawBezierCurve(3, bezCurve);
                return;
            }
            free((char *)u);
            u = uPrime;
        }
    }

/* Fitting failed -- split at max error point and fit recursively */
    tHatCenter = ComputeCenterTangent(d, splitPoint);
    FitCubic(d, first, splitPoint, tHat1, tHatCenter, error);
    V2Negate(&tHatCenter);
    FitCubic(d, splitPoint, last, tHatCenter, tHat2, error);
}
```

```
/*
 *  GenerateBezier :
 *  Use least-squares method to find Bezier control points for region.
 *
 */
static BezierCurve  GenerateBezier(d, first, last, uPrime, tHat1,
                     tHat2)
    Point2      *d;             /*  Array of digitized points        */
    int         first, last;    /*  Indices defining region          */
    double      *uPrime;        /*  Parameter values for region      */
    Vector2     tHat1, tHat2;   /*  Unit tangents at endpoints       */
{
    int         i;
    Vector2     A[MAXPOINTS][2];    /*  Precomputed rhs for eqn      */
    int         nPts;               /*  Number of pts in sub-curve   */
    double      C[2][2];            /*  Matrix C                     */
    double      X[2];               /*  Matrix X                     */
    double      det_C0_C1,          /*  Determinants of matrices     */
                det_C0_X,
                det_X_C1;
    double      alpha_l,            /*  Alpha values, left and right */
                alpha_r;
    Vector2     tmp;                /*  Utility variable             */
    BezierCurve bezCurve;           /*  RETURN bezier curve ctl pts  */ bezCurve = (Point2 *)malloc(4 * sizeof(Point2));
    nPts = last - first + 1;
```

```
/* Compute the A's    */
for (i = 0; i < nPts; i++) {
    Vector2    v1, v2;
    v1 = tHat1;
    v2 = tHat2;
    V2Scale(&v1, B1(uPrime[i]));
    V2Scale(&v2, B2(uPrime[i]));
    A[i][0] = v1;
    A[i][1] = v2;
}

/* Create the C and X matrices    */
C[0][0] = 0.0;
C[0][1] = 0.0;
C[1][0] = 0.0;
C[1][1] = 0.0;
X[0]    = 0.0;
X[1]    = 0.0;

for (i = 0; i < nPts; i++) {
    C[0][0] += V2Dot(&A[i][0], &A[i][0]);
    C[0][1] += V2Dot(&A[i][0], &A[i][1]);
    C[1][0]  = C[0][1];
    C[1][1] += V2Dot(&A[i][1], &A[i][1]);

C[1][0] = C[0][1];
    C[1][1] += V2Dot(&A[i][1], &A[i][1]); /*
/*
```

```
            tmp = V2Sub(d[first + i],
                V2AddII(
                    V2ScaleII(d[first], B0(uPrime[i])),
                    V2AddII(
                        V2ScaleII(d[first], B1(uPrime[i])),
                        V2AddII(
                            V2ScaleII(d[last], B2(uPrime[i])),
                            V2ScaleII(d[last], B3(uPrime[i]))))));

X[0] += V2Dot(&A[i][0], &tmp);
            X[1] += V2Dot(&A[i][1], &tmp);
        }

/* Compute the determinants of C and X    */
        det_C0_C1 = C[0][0] * C[1][1] - C[1][0] * C[0][1];
        det_C0_X  = C[0][0] * X[1]    - C[1][0] * X[0];
        det_X_C1  = X[0]    * C[1][1] - X[1]    * C[0][1];

/* Finally, derive alpha values */
        if (det_C0_C1 == 0.0) {
            det_C0_C1 = (C[0][0] * C[1][1]) * 10e-12;
        }
        alpha_l = det_X_C1 / det_C0_C1;
        alpha_r = det_C0_X / det_C0_C1;
```

10

```
/* If alpha negative, use the Wu/Barsky heuristic (see text) */
if (alpha_l < 0.0 || alpha_r < 0.0) {
    double dist = V2DistanceBetween2Points(&d[last], &d[first]) /
                  3.0;

bezCurve[0] = d[first];
    bezCurve[3] = d[last];
    V2Add(&bezCurve[0], V2Scale(&tHat1, dist), &bezCurve[1]);
    V2Add(&bezCurve[3], V2Scale(&tHat2, dist), &bezCurve[2]);
    return (bezCurve);
}

/* First and last control points of the Bezier curve are */
/* positioned exactly at the first and last data points */
/* Control points 1 and 2 are positioned an alpha distance out */
/* on the tangent vectors, left and right, respectively */
bezCurve[0] = d[first];
bezCurve[3] = d[last];
V2Add(&bezCurve[0], V2Scale(&tHat1, alpha_l), &bezCurve[1]);
V2Add(&bezCurve[3], V2Scale(&tHat2, alpha_r), &bezCurve[2]);
return (bezCurve);
}
```

```
/*
 *  Reparameterize:
 *      Given set of points and their parameterization, try to find
 *   a better parameterization.
 *
 */
static double *Reparameterize(d, first, last, u, bezCurve)
    Point2      *d;             /*  Array of digitized points   */
    int         first, last;    /*  Indices defining region     */
    double      *u;             /*  Current parameter values    */
    BezierCurve bezCurve;       /*  Current fitted curve        */
{
    int         nPts = last-first+1;
    int         i;
    double      *uPrime;        /*  New parameter values        */ uPrime = (double *)malloc(nPts * sizeof(double));
    for (i = first; i <= last; i++) {
        uPrime[i-first] = NewtonRaphsonRootFind(bezCurve, d[i], u[i-
                          first]);
    }
    return (uPrime);
}
```

12

```
/*
 *  NewtonRaphsonRootFind :
 *      Use Newton-Raphson iteration to find better root.
 */
static double NewtonRaphsonRootFind(Q, P, u)
    BezierCurve     Q;          /*  Current fitted curve    */
    Point2          P;          /*  Digitized point         */
    double          u;          /*  Parameter value for "P" */
{
    double          numerator, denominator;
    Point2          Q1[3], Q2[2];   /*  Q' and Q''                          */
    Point2          Q_u, Q1_u, Q2_u; /* u evaluated at Q, Q', & Q''         */
    double          uPrime;     /*  Improved u                              */
    int             i;

/* Compute Q(u) */
    Q_u = Bezier(3, Q, u);

/* Generate control vertices for Q' */
    for (i = 0; i <= 2; i++) {
        Q1[i].x = (Q[i+1].x - Q[i].x) * 3.0;
        Q1[i].y = (Q[i+1].y - Q[i].y) * 3.0;
    }
```

13

```
/* Generate control vertices for Q'' */
for (i = 0; i <= 1; i++) {
    Q2[i].x = (Q1[i+1].x - Q1[i].x) * 2.0;
    Q2[i].y = (Q1[i+1].y - Q1[i].y) * 2.0;
}

/* Compute Q'(u) and Q''(u) */
Q1_u = Bezier(2, Q1, u);
Q2_u = Bezier(1, Q2, u);

/* Compute f(u)/f'(u) */
numerator = (Q_u.x - P.x) * (Q1_u.x) + (Q_u.y - P.y) * (Q1_u.y);
denominator = (Q1_u.x) * (Q1_u.x) + (Q1_u.y) * (Q1_u.y) +
              (Q_u.x - P.x) * (Q2_u.x) + (Q_u.y - P.y) * (Q2_u.y);

/* u = u - f(u)/f'(u) */
uPrime = u - (numerator/denominator);
return (uPrime);
}
```

```
/*
 *  Bezier :
 *      Evaluate a Bezier curve at a particular parameter value
 *
 */
static Point2 Bezier(degree, V, t)
    int         degree;         /* The degree of the bezier curve       */
    Point2      *V;             /* Array of control points              */
    double      t;              /* Parametric value to find point for   */ int         i, j;
    Point2      Q;              /* Point on curve at parameter t        */
    Point2      *Vtemp;         /* Local copy of control points         */
{
/* Copy array */
    Vtemp = (Point2 *)malloc((unsigned)((degree+1)
                * sizeof (Point2)));

for (i = 0; i <= degree; i++) {
        Vtemp[i] = V[i];
    }
```

```
/* Triangle computation    */
for (i = 1; i <= degree; i++) {
    for (j = 0; j <= degree-i; j++) {
        Vtemp[j].x = (1.0 - t) * Vtemp[j].x + t * Vtemp[j+1].x;
        Vtemp[j].y = (1.0 - t) * Vtemp[j].y + t * Vtemp[j+1].y;
    }
}

Q = Vtemp[0];
free((char *)Vtemp);
return Q;
}

/*
 * B0, B1, B2, B3 :
 *  Bezier multipliers
 */
static double B0(u)
    double u;
{
    double tmp = 1.0 - u;
    return (tmp * tmp * tmp);
}
```

```
static double B1(u)
    double u;
{
    double tmp = 1.0 - u;
    return (3 * u * (tmp * tmp));
} static double B2(u)
    double u;
{
    double tmp = 1.0 - u;
    return (3 * u * u * tmp);
} static double B3(u)
    double u;
{
    return (u * u * u);
}
```

```
/*
 * ComputeLeftTangent, ComputeRightTangent, ComputeCenterTangent :
 *Approximate unit tangents at endpoints and "center" of digitized curve
 */
static Vector2 ComputeLeftTangent(d, end)
    Point2  *d;         /* Digitized points*/
    int     end;        /* Index to "left" end of region */
{
    Vector2 tHat1;
    tHat1 = V2Sub(d[end+1], d[end]);
    tHat1 = *V2Normalize(&tHat1);
    return tHat1;
} static Vector2 ComputeRightTangent(d, end)
    Point2  *d;         /* Digitized points */
    int     end;        /* Index to "right" end of region */
{
    Vector2 tHat2;
    tHat2 = V2Sub(d[end-1], d[end]);
    tHat2 = *V2Normalize(&tHat2);
    return tHat2;
}
```

18

```
static Vector2 ComputeCenterTangent(d, center)
    Point2  *d;         /* Digitized points              */
    int     center;     /* Index to point inside region  */
{
    Vector2 V1, V2, tHatCenter;

V1 = V2Sub(d[center-1], d[center]);
    V2 = V2Sub(d[center], d[center+1]);
    tHatCenter.x = (V1.x + V2.x)/2.0;
    tHatCenter.y = (V1.y + V2.y)/2.0;
    tHatCenter = *V2Normalize(&tHatCenter);
    return tHatCenter;
}

/*
 *  ChordLengthParameterize :
 *  Assign parameter values to digitized points
 *  using relative distances between points.
 */
static double *ChordLengthParameterize(d, first, last)
    Point2  *d;             /* Array of digitized points  */
    int     first, last;    /* Indices defining region    */
{
    int     i;
    double  *u;             /* Parameterization           */
```

19

```
    u = (double *)malloc((unsigned)(last-first+1) *
        sizeof(double));

u[0] = 0.0;
    for (i = first+1; i <= last; i++) {
        u[i-first] = u[i-first-1] +
                     V2DistanceBetween2Points(&d[i], &d[i-1]);
    } for (i = first + 1; i <= last; i++) {
        u[i-first] = u[i-first] / u[last-first];
    } return(u);
}
```

20

```
/*
 *  ComputeMaxError :
 *  Find the maximum squared distance of digitized points
 *  to fitted curve.
*/
static double ComputeMaxError(d, first, last, bezCurve, u,
            splitPoint)
    Point2      *d;         /* Array of digitized points     */
    int         first, last;    /* Indices defining region   */
    BezierCurve bezCurve;       /* Fitted Bezier curve       */
    double      *u;         /* Parameterization of points    */
    int         *splitPoint;    /* Point of maximum error    */
{
    int         i;
    double      maxDist;    /* Maximum error                 */
    double      dist;       /* Current error                 */
    Point2      P;          /* Point on curve                */
    Vector2     v;          /* Vector from point to curve    */

*splitPoint = (last - first + 1)/2;
    maxDist = 0.0;
    for (i = first + 1; i < last; i++) {
        P = Bezier(3, bezCurve, u[i-first]);
        v = V2Sub(P, d[i]);
        dist = V2SquaredLength(&v);
        if (dist >= maxDist) {
```

```
            maxDist = dist;
            *splitPoint = i;
        }
    }
    return (maxDist);
} static Vector2 V2AddII(a, b)
    Vector2 a, b;
{
    Vector2 c;
    c.x = a.x + b.x; c.y = a.y + b.y;
    return (c);
} static Vector2 V2ScaleII(v, s)
    Vector2 v;
    double s;
{
    Vector2 result;
    result.x = v.x * s; result.y = v.y * s;
    return (result);
} static Vector2 V2Sub(a, b)
    Vector2 a, b;
{
    Vector2 c;
    c.x = a.x - b.x; c.y = a.y - b.y;
    return (c);
}
```

Appendix B

```
FitCurve(d, ε)
    d : array[ ] of point;   Array of digitized points
    ε : double;              User-specified error
begin
    Compute t̂₁ and t̂₂, the unit tangent
        vectors at the ends of the digitized points;
    FitCubic(d, t̂₁, t̂₂, ε);
end FitCubic(d, t̂₁, t̂₂, ε)
    d       : array[ ] of point;   Array of digitized points
    t̂₁, t̂₂ : vector;              Endpoint tangents
    ε       : double;              User-specified error
begin
    Compute chord-length parameterization of digitized points;
    Fit a single cubic Bezier curve to digitized points;
    Compute the maximum distance from points
        to curve;
    If error < ε
        then begin
            DrawBezierCurve;
            return;
        end;
```

1

```
if error < ψ
    then begin
        for i: integer ← 0, i ← 1, while i < maxIterations do
            begin
                Reparameterize the points:
                Fit a single cubic Bezier curve to digitized points:
                Compute the maximum distance from points to curve:
                if error < ε
                    then begin
                        DrawBezierCurve:
                        return:
                    end
            end
        endloop
    else begin
        Compute unit tangent at point of maximum error:
        Call FitCubic on the "left" side:
        Call FitCubic on the "right" side:
    end
end
```

We claim:

1. A method for generating a vector representation of the skeletal configuration of an elongate graphic image from a raster representation thereof, the method comprising:

providing a gray scale raster representation of the graphic image;

for at least on of a plurality of lines of the raster representation, performing the following processes at least once:

employing the gray scale raster representation to determine two path endpoints; and computing a midpoint between the two endpoints; and generating the vector representation using the computed midpoints for the lines of the raster representation.

2. A method according to claim 1 and also comprising generating a centerline to fit the midpoints.

3. A method according to claim 2 and also comprising performing a physical operation along the centerline.

4. A method according to claim 2 wherein said plurality of lines of the raster representation includes at least one set of at least three segments having adjacent ends, and wherein said step of generating a centerline comprises generating a centerline for each of the segments, thereby to define at least one set of at least three centerlines having adjacent ends, said method also comprising:

for each said set of at least three centerlines;

for each centerline from among said at least three centerlines, computing a tangent to that centerline at that centerline's adjacent end; and connecting pairs of adjacent centerline ends so as to minimize angular separation between the tangents to the connected centerlines at their respective connected ends.

5. A method according to claim 1 and also comprising performing a physical operation along a centerline of the skeletal configuration of the graphic image which fits the midpoints.

6. A method according to claim 5 wherein the physical operation comprises cutting.

7. A method according to claim 5 wherein the physical operation comprises routing.

8. A method according to claim 5 wherein the physical operation comprises engraving.

9. A method according to claim 5 wherein the physical operation comprises painting.

10. A method according to claim 5 wherein the physical operation comprises printing.

11. A method according to claim 1 wherein said gray-scale representation providing process comprises gray-scale scanning of a graphic image.

12. A method according to claim 1 wherein the processes performed at least once for at least one line are performed at least once for at least one column and at least once for at least one row.

13. A method according to claim 12 and also comprising:

selecting a plurality of skeleton pixels; and replacing each skeleton pixel with the midpoint computed for a line in which the skeleton pixel is included.

14. A method according to claim 13 wherein said line comprises the row in which the skeleton pixel is included, if the endpoints for that row are closer together than the endpoints for the column in which the skeleton pixel is included, and wherein said line comprises the column in which the skeleton pixel is included, if the endpoints for that column are closer together than the endpoints for the row in which the skeleton pixel is included.

15. A method according to claim 1 wherein at least one line from among said Plurality of lines comprises a row.

16. A method according to claim 1 wherein at least one line from among said plurality of lines comprises a column.

17. A method for identifying midpoints lying along the skeletal configuration of a graphic image from a raster representation thereof, the method comprising:

providing a gray scale raster representation of the graphic image;

for each of a plurality of lines of the raster representation:

determining two path endpoints using the gray scale raster representation; and computing a midpoint between the two endpoints.

18. A method according to claim 17 wherein said grayscale representation providing process comprises gray-scale scanning of a graphic image.

19. An apparatus for generating a vector representation of the skeletal configuration of an elongate graphic image from a raster representation thereof, the apparatus comprising:

a gray-scale scanner operative to perform gray-scale scanning of a graphic image, thereby to generate a gray scale raster representation of the graphic image;

an endpoint identifier operative to determine two path endpoints for each of a plurality of lines of the gray scale raster representation;

a midpoint computer operative to compute a midpoint between the two endpoints; and a vector generator operative to generate the vector representation using the computed midpoints for the lines of the raster representation.

20. Apparatus according to claim 19 wherein the endpoint identifier and midpoint computer operate on each of a plurality of rows and on each of a plurality of columns and wherein the midpoints computed for lines which are generally parallel to the skeletal configuration of the graphic image are substantially disregarded.

21. Apparatus according to claim 19 and also comprising mechanical apparatus for performing a mechanical operation along the centerline of the skeletal configuration of the graphic image.

22. Apparatus according to claim 19 wherein the mechanical apparatus comprises a cutter.

23. Apparatus according to claim 19 wherein the mechanical apparatus comprises a router.

24. Apparatus according to claim 19 wherein the mechanical apparatus comprises an engraver.

25. Apparatus according to claim 19 wherein the mechanical apparatus comprises a painter.

26. Apparatus according to claim 19 wherein the mechanical apparatus comprises a printer.

27. An apparatus operative to identify midpoints lying along the skeletal configuration of a graphic image from a raster representation thereof, the apparatus comprising:

a gray-scale scanner operative to perform gray-scale scanning of a graphic image, thereby to generate a gray scale raster representation of the graphic image;

an endpoint identifier operative to determine two path endpoints using the gray scale raster representation; and a midpoint computer operative to compute a midpoint between the two endpoints.

* * * * *